US010125036B2

(12) United States Patent
Jikihara et al.

(10) Patent No.: US 10,125,036 B2
(45) Date of Patent: Nov. 13, 2018

(54) ION EXCHANGE MEMBRANE, METHOD FOR PRODUCING SAME, AND ELECTRODIALYZER

(71) Applicants: KURARAY CO., LTD., Kurashiki-shi (JP); YAMAGUCHI UNIVERSITY, Yamaguchi-shi (JP)

(72) Inventors: Atsushi Jikihara, Kurashiki (JP); Kenichi Kobayashi, Kurashiki (JP); Takahiro Nakashima, Saijo (JP); Mitsuru Higa, Ube (JP)

(73) Assignees: KURARAY CO., LTD., Kurashiki-shi (JP); YAMAGUCHI UNIVERSITY, Yamaguchi-shi (JP)

( * ) Notice: Subject to any disclaimer, the term of this patent is extended or adjusted under 35 U.S.C. 154(b) by 692 days.

(21) Appl. No.: 14/747,032

(22) Filed: Jun. 23, 2015

(65) Prior Publication Data

US 2015/0291452 A1     Oct. 15, 2015

Related U.S. Application Data

(63) Continuation of application No. PCT/JP2013/083840, filed on Dec. 18, 2013.

(30) Foreign Application Priority Data

Dec. 25, 2012   (JP) ................................ 2012-281807

(51) Int. Cl.
| | | |
|---|---|---|
| C08J 5/22 | (2006.01) | |
| B01D 71/38 | (2006.01) | |
| C02F 1/469 | (2006.01) | |
| B01D 61/42 | (2006.01) | |
| B01D 67/00 | (2006.01) | |
| B01D 69/10 | (2006.01) | |
| B01D 71/80 | (2006.01) | |

(52) U.S. Cl.
CPC .......... C02F 1/4693 (2013.01); C08J 5/2231 (2013.01); *B01D 61/422* (2013.01); *B01D 67/0006* (2013.01); *B01D 69/10* (2013.01); *B01D 71/38* (2013.01); *B01D 71/80* (2013.01); *B01D 2323/30* (2013.01); *B01D 2325/42* (2013.01); *C02F 2201/46* (2013.01); *C08J 2329/04* (2013.01)

(58) Field of Classification Search
CPC ... C02F 1/4693; C02F 2201/46; C08J 5/2231; C08J 2329/04; B01D 71/38; B01D 71/80; B01D 2325/42; B01D 61/422; B01D 67/0006; B01D 69/10; B01D 2323/30
USPC ........................................................ 521/27
See application file for complete search history.

(56) References Cited

U.S. PATENT DOCUMENTS

| | | | |
|---|---|---|---|
| 4,565,854 A | 1/1986 | Sato et al. | |
| 5,547,551 A * | 8/1996 | Bahar ................ | B01D 67/0088 204/296 |
| 5,599,614 A | 2/1997 | Bahar et al. | |
| 6,254,978 B1 | 7/2001 | Bahar et al. | |
| RE37,307 E | 8/2001 | Bahar et al. | |
| RE37,701 E | 5/2002 | Bahar et al. | |
| 8,716,358 B2 * | 5/2014 | Jikihara ................ | B01D 61/44 521/27 |
| 9,162,185 B2 * | 10/2015 | Ohmura ..................... | C08J 5/22 |
| 9,266,069 B2 * | 2/2016 | Higa ...................... | B01D 61/44 |
| 9,321,047 B2 | 4/2016 | Jikihara et al. | |
| 9,346,020 B2 | 5/2016 | Jikihara et al. | |
| 2002/0011684 A1 | 1/2002 | Bahar et al. | |
| 2002/0022123 A1 | 2/2002 | Bahar et al. | |
| 2003/0113604 A1 | 6/2003 | Bahar et al. | |
| 2004/0067402 A1 | 4/2004 | Bahar et al. | |
| 2007/0264551 A1 * | 11/2007 | Matsunaga ......... | H01M 4/8605 429/483 |
| 2012/0031834 A1 * | 2/2012 | Higa ...................... | B01D 61/44 210/500.42 |
| 2012/0035280 A1 * | 2/2012 | Jikihara ................ | B01D 61/44 521/27 |
| 2012/0285881 A1 * | 11/2012 | Jikihara ................ | B01D 69/02 210/490 |
| 2013/0146450 A1 | 6/2013 | Kishino et al. | |
| 2014/0014519 A1 * | 1/2014 | Ohmura ..................... | C08J 5/22 204/632 |
| 2014/0200280 A1 | 7/2014 | Jikihara et al. | |
| 2015/0209732 A1 | 7/2015 | Nakashima et al. | |
| 2015/0239756 A1 | 8/2015 | Jikihara et al. | |

FOREIGN PATENT DOCUMENTS

| | | |
|---|---|---|
| CN | 1178482 A | 4/1998 |
| CN | 102449042 A | 5/2012 |

(Continued)

OTHER PUBLICATIONS

Office Action dated May 30, 2017, in Japanese Patent Application No. 2014-554353 (w/ English summary).

(Continued)

*Primary Examiner* — Michael Bernshteyn
(74) *Attorney, Agent, or Firm* — Oblon, McClelland, Maier & Neustadt, L.L.P.

(57) ABSTRACT

Provided is an ion exchange membrane including an ionic vinyl alcohol polymer having a cation exchange group or an anion exchange group. The ion exchange membrane 1 includes a porous support 3 and the ionic vinyl alcohol polymer. The porous support is provided, in a thickness direction from one surface thereof, with an impregnated layer 2 at least a part of which is impregnated with the ionic vinyl alcohol polymer. The ionic vinyl alcohol polymer includes an ionic vinyl alcohol polymer having an ion exchange group selected from a cation exchange group or an anion exchange group. The ion exchange membrane has a zeta potential value ($\zeta 1$) at one surface and a zeta potential value ($\zeta 2$) at the other surface, which are represented by the formula (1).

$$(|\zeta 1|-|\zeta 2|)/|\zeta 1|<0.5 \ (|\zeta 1|\geq|\zeta 2|) \tag{1}$$

12 Claims, 6 Drawing Sheets

(56) References Cited

FOREIGN PATENT DOCUMENTS

| | | |
|---|---|---|
| CN | 102458618 A | 5/2012 |
| EP | 0 814 897 B1 | 6/2006 |
| EP | 2 412 752 A1 | 2/2012 |
| EP | 2 420 310 A1 | 2/2012 |
| EP | 2 520 357 A1 | 11/2012 |
| EP | 2 896 600 A1 | 7/2015 |
| JP | 59-187003 | 10/1984 |
| JP | 59-189113 | 10/1984 |
| JP | 2005-342718 | 12/2005 |
| JP | 2007-280946 | 10/2007 |
| JP | 2009-096923 | 5/2009 |
| JP | 2012-001621 | 1/2012 |
| JP | 2012-040508 | 3/2012 |
| WO | WO 96/28242 A1 | 9/1996 |
| WO | WO 2010/110333 | 9/2010 |
| WO | WO 2010/119858 | 10/2010 |
| WO | WO 2011/081145 | 7/2011 |
| WO | WO 2012/133538 | 10/2012 |

OTHER PUBLICATIONS

Office Action dated Jun. 6, 2017, in Taiwan Patent Application No. 102147866 (w/ English translation of the Search Report attached to the Office Action).

Combined Chinese Office Action and Search Report dated Dec. 6, 2016 in Chinese Patent Application No. 201380068017.4 (with English language translation of the Search Report).

International Search Report dated Apr. 1, 2014 in PCT/JP2013/083840 filed Dec. 18, 2013.

Japanese Office Action dated Jan. 9, 2018 in Japanese Patent Application No. 2014-554353 (with unedited computer generated English translation).

Extended European Search Report dated Jul. 25, 2016 in Patent Application No. 13869781.8.

* cited by examiner

ION EXCHANGE MEMBRANE, METHOD FOR PRODUCING SAME, AND ELECTRODIALYZER

CROSS REFERENCE TO THE RELATED APPLICATION

This application is a continuation application, under 35 U.S.C. § 111(a), of international application No. PCT/JP2013/083840, filed Dec. 18, 2013, which claims priority to Japanese Patent Application No. 2012-281807, filed Dec. 25, 2012 in Japan, the entire disclosure of which is herein incorporated by reference as a part of this application.

FIELD OF THE INVENTION

The present invention relates to an ion exchange membrane which contains an ionic vinyl alcohol polymer having a cation exchange group or an anion exchange group, and particularly to an ion exchange membrane which contains an ionic vinyl alcohol polymer and which is useful as an ion exchange membrane for electrodialysis (particularly for electrodialysis reversal).

BACKGROUND ART

An ion exchange membrane is used as a membrane for electrodialysis in salt production and for removal of salts from underground brine, food and the like. In the process of electrodialysis, ions move when a direct current is applied to electrodes in an electrodialysis vessel in which anion exchange membranes and cation exchange membranes are alternately arranged and fastened between the electrodes, i.e., cathode and anode. Accordingly, desalting compartments where the ion concentration decreases and concentration compartments where the ion concentration increases are alternately placed. Typically with continued electrodialysis, the concentration of a hardly-soluble salt is increased in the concentration compartment so that scaling occurs due to precipitation of the salt. In order to prevent scaling, a chemical substance such as an acid is added in the concentration compartment, however, there is a problem that a large amount of the chemical substance has to be used.

Upon this problem, electrodialysis reversal (Electro Dialysis Reversal: EDR) was developed in order to prevent scaling by reversing the polarity of electrodes before the salt concentration in the concentration compartment reaches a critical concentration for occurrence of scaling. This method enables to remove deposits on an ion exchange membrane generated in the normal phase operation from the ion exchange membrane by means of a repulsive force of charges during reverse phase operation.

Patent Document 1 (WO 2010-119858) discloses an ion exchange membrane in which an ion exchanger composed of a block or graft copolymer comprising a cationic or anionic copolymer component and a vinyl alcohol copolymer component is formed on a supporting layer by printing.

Patent Document 1 discloses the following features for the ion exchange membrane.

(1) Fouling resistance: the problem on organic contamination resistance (fouling resistance) may be solved by including as a constitutional unit a vinyl alcohol polymer that is a hydrophilic polymer.

(2) Mechanical strength: mechanical strength is imparted to the ion exchange membrane by locating the ion exchange membrane on a supporting layer.

(3) Electrical properties (resistance): electrical properties may be imparted to the ion exchange membrane by providing a copolymer comprising a vinyl alcohol polymer and an ionic group-containing polymer.

Patent Document 2 (JP Laid-open Patent Publication No. 2012-40508) discloses an ion exchange membrane including a nonwoven fabric sheet, and an ion exchange resin-coated layer provided on one surface of the nonwoven fabric sheet. The nonwoven fabric sheet has a fiber layer structure comprising a fine fiber layer having a fiber diameter of 5 μm or less as an intermediate layer and continuous fiber layers each having a fiber diameter of 8 to 30 μm on both surface of the fine fiber layer, wherein the fiber layer structure is formed by fiber to fiber fusion.

In Patent Document 2, the fine fiber layer is provided as an intermediate layer between two continuous fiber layers. Thus, even when an inexpensive nonwoven fabric sheet is used, the strength, dimension stability and shape stability can be improved, and the occurrence of undulation caused by contact of the nonwoven fabric sheet with an electrolytic solution is effectively suppressed, so that an ion exchange membrane having low membrane resistance can be obtained.

SUMMARY OF THE INVENTION

However, the ion exchange membranes disclosed in Patent Documents 1 and 2 have the following problem that a large electric differential across two opposing sides of the membrane causes difference in mobility of ions in the membrane, leading to occurrence of ion concentration polarization in the membrane. As a result, the ion exchange membrane can neither reduce cell resistance, nor be used for particularly electrodialysis reversal apparatus. Further, the ion exchange membrane disclosed in Patent Document 2 has a problem that, when the ion exchange membrane is used for electrodialysis, because of insufficient adhesion between a base material sheet and an ion exchange resin, the ion exchange resin is detached from the base material during long-term operations for electrodialysis, leading to generation of blisters (water blisters).

An object according to the present invention is to provide an ion exchange membrane which is less susceptible to ion concentration polarization in the membrane due to a small difference in zeta potential across two opposing sides of the membrane, and a method for producing the ion exchange membrane.

Another object according to the present invention is to provide an ion exchange membrane which is resistant to generation of blisters even when the ion exchange membrane is used over a long period of time, and a method for producing the ion exchange membrane.

Means for Solving the Problems

The inventors according to the present invention have extensively conducted studies on the above-mentioned problems, and found that by applying a specific ionic polymer to a porous support in a specific production method, not only a specific impregnated layer containing the ionic polymer can be formed on the porous support, but also the resultant ion exchange membrane makes it possible to have specific zeta potential values generated in a liquid across the two opposing sides in a specific small difference. Based on the above findings, the inventors have further found that such an ion exchange membrane can be suppress occurrence of ion concentration polarization in the membrane so that current efficiency of a cell can be enhanced; and found that formation of the impregnated layer within the porous support can reduce detachment of the ionic polymer from the support so that blisters which result from the detachment are hardly generated; and finally have completed the present invention.

First aspect according to the present invention provides an ion exchange membrane comprising a porous support and an ionic vinyl alcohol polymer, wherein at least a part of the porous support is impregnated with the ionic vinyl alcohol polymer in a thickness direction from one surface of the porous support to form an impregnated layer;

the ionic vinyl alcohol polymer includes at least an ionic vinyl alcohol polymer having an ion exchange group selected from a cation exchange group and an anion exchange group; and the ion exchange membrane has values of a zeta potential ($\zeta 1$) of one surface of and a zeta potential ($\zeta 2$) of the other surface which are represented by the formula (1).

$$(|\zeta 1|-|\zeta 2|)/|\zeta 1|<0.5 \ (|\zeta 1|\geq|\zeta 2|) \quad (1)$$

In the ion exchange membrane, the porous support is preferably a nonwoven fabric (for example, a wet-laid nonwoven fabric, preferably a wet-laid nonwoven fabric of polyvinyl alcohol cut fibers), or a synthetic resin fabric. The porous support may have a porosity of 40 to 90%.

In the ion exchange membrane, the ionic vinyl alcohol polymer may be a copolymer of an ion exchange monomer and a monomer capable of forming a vinyl alcohol polymer, wherein the ion exchange monomer is present in an amount of 0.1% by mole or higher in the ionic vinyl alcohol polymer. The ionic vinyl alcohol polymer may be a block copolymer comprising a copolymer component of polymerized ion exchange monomers, and a polyvinyl alcohol copolymer component.

In the ion exchange membrane, the ionic vinyl alcohol polymer may be a crosslinked polymer in a state applied to the porous support.

This ion exchange membrane can be used in various kinds of electrodialysis devices, and can be suitably used particularly in electrodialysis reversal type electrodialyzers.

A second aspect according to the present invention also includes a method for producing an ion exchange membrane. The production method comprising:

providing a solution of an ionic vinyl alcohol polymer;

applying the solution onto a release film to form a coated fluid layer (coated liquid layer) containing the ionic vinyl alcohol polymer;

overlaying a porous support onto the coated fluid layer, and impregnating at least a part of the porous support with the ionic vinyl alcohol polymer solution to form an impregnated body;

drying the impregnated body in which the porous support is overlaid to be impregnated with the coated fluid layer on the release film; and peeling the release film from the dried impregnated body.

In the production method, the ionic vinyl alcohol polymer may be subjected to a heat treatment and/or a crosslinking treatment (chemical crosslinking treatment) after the peeling step. Further, the ionic vinyl alcohol polymer may be preferably subjected to a crosslinking treatment after subjecting the ionic vinyl alcohol polymer to the heat treatment.

A third aspect according to the present invention also includes an electrodialyzer, and the electrodialyzer at least comprises:

an anode and a cathode; and a desalting compartment and a concentration compartment each formed by alternately arranging an anion exchange membrane and a cation exchange membrane between the anode and the cathode, wherein the anion exchange membrane and the cation exchange membrane each include an ion exchange membrane as described above.

In the present invention, the impregnation means a state in which the ionic vinyl alcohol polymer substantially fills and bridges voids and/or pores of the porous support.

Effects of the Invention

According to the present invention, the ion exchange membrane can have a reduced zeta potential generated in a liquid across two opposing surfaces due to applying a specific ionic polymer to a porous support in a specific production method. Accordingly, occurrence of ion concentration polarization in the ion exchange membrane during electrodialysis can be suppressed, so that current efficiency can be enhanced.

Since a porous support is impregnated with a specific ionic polymer, there can be provided an ion exchange membrane which is resistant to generation of blisters and also can be used for electrodialysis over a long period of time without causing water leaking outside.

Any combinations of at least two components disclosed in the claims and/or specification and/or drawings are included in the present invention. Particularly, any combinations of two or more claims described in the claims are included in the present invention.

BRIEF DESCRIPTION OF THE DRAWINGS

The present invention will be more clearly understood from the preferred embodiments described below with reference to the attached drawings. However, the drawings are not necessarily shown on a fixed scale, and may be exaggerated in showing the principle according to the present invention. The embodiments and the drawings are merely illustrative and explanatory, and should not be used for defining the scope according to the present invention. The scope according to the present invention is defined by the attached claims.

Figure 1:
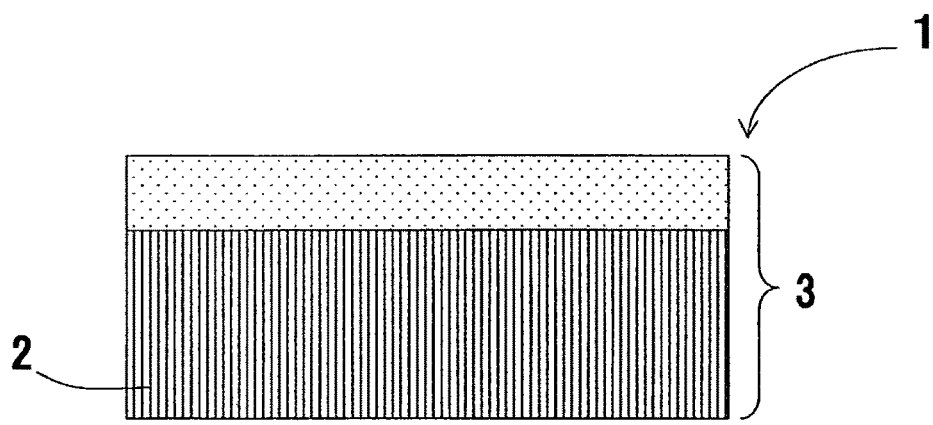
FIG. 1 is a schematic sectional view for illustrating an ion exchange membrane according to one embodiment according to the present invention.

Description of reference numerals in FIGS. 3, 4, 5A and 5B are as follows:

A: power
B: ampere meter
C: coulomb meter
D: voltmeter
E: motor
F: stirrer

G: cathode electrode
H: anode electrode
I: 0.5M NaCl aqueous solution
J: ion exchange membrane (effective membrane area: 8.0 cm$^2$)
K: ion exchange membrane (effective membrane area: 1.0 cm$^2$)
L: platinum electrode
M: NaCl aqueous solution
N: water bath
O: LCR meter
21: ion exchange membrane
22: heat-sealable film of polyethylene terephthalate/ethylene-vinyl acetate (EVA) copolymer
23: sheet having a ion exchange resin-coated layer
24: EVA filled portion

DESCRIPTION OF EMBODIMENTS

FIG. 1 is a schematic sectional view for illustrating one embodiment of an ion exchange membrane according to the present invention. As shown in FIG. 1, an ion exchange membrane 1 is composed of a porous support 3 formed of a wet-laid nonwoven fabric or the like, and an ionic vinyl alcohol polymer.

At least a part of the porous support 3 is impregnated with the ionic vinyl alcohol polymer in a thickness direction from one surface of the porous support to form an impregnated layer 2. Since the impregnated layer 2 is present in the porous support, the ion exchange membrane 1 is capable of preventing water leaking outside during use.

As shown in FIG. 1, the impregnated layer 2 may have a thickness of equal to or more than 50% of the thickness of the porous support 3. The thickness of the impregnated layer refers to the thickness of a portion in which voids and/or pores existing in the porous support 3 are substantially filled with the ionic vinyl alcohol polymer. The phrase "substantially filled with the ionic vinyl alcohol polymer" refers to a state in which a major (i.e., more than half) amount of the void or pore is filled with the ionic vinyl alcohol polymer.

The ionic vinyl alcohol polymer comprising an ionic vinyl alcohol polymer selected from a cationic polymer or an anionic polymer.

(Ionic Vinyl Alcohol Polymer)

The ionic vinyl alcohol polymer to be used in the present invention comprises at least an ionic vinyl alcohol polymer having an ion exchange group selected from a cation exchange group or an anion exchange group. It should be noted that the ionic vinyl alcohol polymer may be used in combination with other polymers (for example, a nonionic vinyl alcohol polymer) within the range that does not adversely affect the effect of the invention.

The ionic vinyl alcohol polymer is a copolymer at least comprising a copolymer component (a-1) comprising a structural unit derived from a vinyl alcohol monomer (A-1), and a copolymer component (a-2) comprising a structural unit derived from an ion exchange monomer (A-2).

The ion exchange monomer may be a monomer having an anion exchange group or a monomer having a cation exchange group. The copolymer may have any form such as a random or block form, and is preferably a block copolymer.

(Copolymer of Ion Exchange Monomer and Vinyl Alcohol Monomer)

According to the present invention, the ionic vinyl alcohol polymer comprising a cation exchange group or an anion exchange group as described above has a copolymer structure of an ion exchange monomer and a vinyl alcohol monomer. It should be noted that the vinyl alcohol monomer also includes a monomer being capable of forming a vinyl alcohol structure via saponification and may include a vinyl ester monomer as described below. It is preferable to have a copolymer structure with a vinyl alcohol monomer from the viewpoint of strength of the ion exchange membrane, flexibility, and physical or chemical crosslinking formation.

(Proportions of Vinyl Alcohol Monomer and Ion Exchange Monomer)

The ionic vinyl alcohol polymer to be used in the present invention may have a proportion range of vinyl alcohol monomer (A-1) of 99 to 50% by mole and a proportion range of ion exchange monomer (A-2) of 1 to 50% by mole, wherein the total amount of the monomers (A-1) and (A-2) is 100% by mole. The ionic vinyl alcohol polymer has more preferably a proportion range of vinyl alcohol monomer (A-1) of 97 to 60% by mole and a proportion range of ion exchange monomer (A-2) of 3 to 40% by mole.

Where the proportion of the ion exchange monomer is too low, there is a possibility that the ion exchange membrane may have a lower selectivity of the counter ion due to decrease in effective charge density in the membrane. In contrast, where the proportion of the ion exchange monomer is too high, there is a possibility that the mechanical strength of the ion exchange membrane may be reduced due to high swelling degree of the ion exchange membrane.

(Ionic Vinyl Alcohol Polymer Having an Anion Exchange Group)

The ionic vinyl alcohol polymer having an anion exchange group (sometimes referred to as a cationic polymer) used in the present invention is a copolymer having an anion exchange group (sometimes referred to as a cationic group) in the molecule. The cationic group may be in any portion, such as in main chain, in a side chain, or at a terminal end. As the cationic group there may be exemplified an ammonium group, an iminium group, a sulfonium group, a phosphonium group, and the like. Further, the polymer having a cationic group according to the present invention may include a polymer having functional groups partly convertible to an ammonium group or an iminium group in water, such as an amino group or an imino group. Among them, from the viewpoint of industrial availability, the preferable cationic group includes an ammonium group. As the ammonium group, there may be used any of a primary ammonium group (or ammonium salt), a secondary ammonium group (or ammonium salt), a tertiary ammonium group (or ammonium salt), and a quaternary ammonium group (or ammonium salt). The preferable ammonium group includes a quaternary ammonium group (trialkylammonium group). The cationic polymer may have a single species of cationic group or may have a plurality of species of cationic groups. There is no particular limitation with respect to counter anions for the cationic groups. Examples of counter anions may include a halide ion, a hydroxide ion, a phosphate ion, a carboxylate ion and others. Among them, in view of easy availability, the counter anion may be preferably a halide ion, and more preferably a chloride ion. The cationic polymer may have a single species of counter anion or may have a plurality of species of counter anions.

The cationic polymer may be a copolymer at least comprising a vinyl alcohol structural unit and a cationic group-containing structural unit, and may further comprise a structural unit without the cationic group within the range that does not adversely affect the effect of the invention. In addition, the polymer may be preferably crosslinkable. The cationic polymer may be a single species of cationic polymer, or comprise a plurality of species of cationic polymers.

As long as it does not inhibit the effect of the invention, these cationic polymers may be used in combination with a polymer other than the cationic polymer. Herein a polymer other than the cationic polymer is preferably not an anionic polymer.

For example, as a preferable cationic polymer, there may be exemplified a polymer comprising a vinyl alcohol structural unit and a structural unit each represented by the following general formulae (1) to (8).

[Chem. 1]

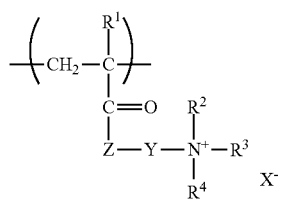
(1)

Wherein $R^1$ represents a hydrogen atom or an alkyl group having 1 to 4 carbon atoms; $R^2$, $R^3$ and $R^4$ independently represent a hydrogen atom or an alkyl, aralkyl or aryl group having 1 to 18 carbon atoms which may have a substituent; $R^2$, $R^3$ and $R^4$ may form a saturated or unsaturated cyclic structure by connecting with each other; Z represents —O—, —NH—, or —N(CH$_3$)—; Y represents a divalent linking group having 1 to 8 carbon atoms in total which may contain an oxygen, a nitrogen, a sulfur or a phosphorous atom; and $X^-$ represents an anion.

Preferably $R^2$, $R^3$ and $R^4$ may be independently a hydrogen atom, a linear or branched $C_{1-8}$ alkyl group [more preferably a linear or branched $C_{1-4}$ alkyl group (for example, a methyl group, an ethyl group, an isopropyl group, a t-butyl group, and others)], a phenyl group, a naphthyl group, a benzyl group, a phenethyl group, and others. $R^2$, $R^3$ and $R^4$ may be the same or different, and preferably the same group.

The counter anion $X^-$ in the general formula (1) may be exemplified as a halide ion, a hydroxide ion, a phosphate, and a carboxylate ion. The cationic monomer capable of forming the structural unit represented by the general formula (1) may include 3-(meth)acrylamide-alkyltrialkylammonium salts such as 3-(meth)acrylamide-propyltrimethylammonium chloride, 3-(meth)acrylamide-3,3-dimethyl-propyltrimethylammonium chloride, and the like.

[Chem. 2]

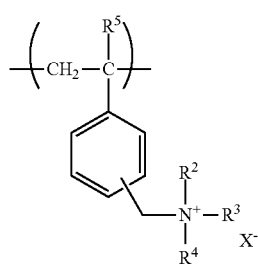
(2)

Wherein $R^5$ represents a hydrogen atom or a methyl group. $R^2$, $R^3$, $R^4$ and $X^-$ are the same as defined in the general formula (1).

Examples of the cationic monomers capable of forming the structural unit represented by the general formula (2) may include (vinylbenzyl)trialkylammonium salts such as (vinylbenzyl)trimethylammonium chloride, and the like.

[Chem. 3]

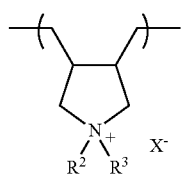
(3)

Wherein, $R^2$, $R^3$ and $X^-$ are the same as defined in the general formula (1).

[Chem. 4]

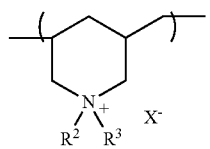
(4)

Wherein, $R^2$, $R^3$ and $X^-$ are the same as defined in the general formula (1).

Examples of the cationic monomers capable of forming the structural units each represented by the general formulae (3) and (4) may include diallyldialkylammonium salts such as diallyldimethylammonium chloride and the like. The above structural unit can be formed by cyclopolymerization of these monomers.

[Chem. 5]

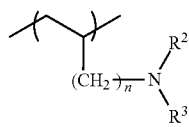
(5)

Wherein n represents 0 or 1; and $R^2$ and $R^3$ are the same as defined in the general formula (1).

Examples of the cationic monomers represented by the general formula (5) may include allylamine.

[Chem. 6]

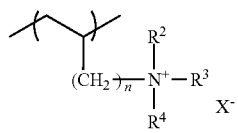
(6)

Wherein, n represents 0 or 1; and $R^2$, $R^3$, $R^4$ and $X^-$ are the same as defined in the general formula (1).

Examples of the cationic monomers capable of forming the structural unit represented by the general formula (6) may include allylammonium salts such as allylamine hydrochloride salt or the like.

[Chem. 7]

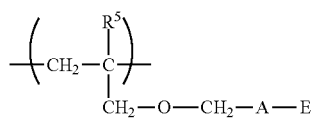

(7)

Wherein $R^5$ represents a hydrogen atom or a methyl group; A represents —CH(OH)CH$_2$—, —CH$_2$CH(OH)—, —C(CH$_3$)(OH)CH$_2$—, —CH$_2$C(CH$_3$)(OH)—, —CH(OH) CH$_2$CH$_2$—, or —CH$_2$CH$_2$CH(OH)—; E represents —N(R$^6$)$_2$ or —N$^+$(R$^6$)$_3$.X$^-$; and R$^6$ represents a hydrogen atom or a methyl group; and X$^-$ represents an anion.

Examples of the cationic monomers capable of forming the structural unit represented by the general formula (7) may include N-(3-allyloxy-2-hydroxypropyl)dimethylamine or quarternary ammonium salts thereof, and N-(4-allyloxy-3-hydroxybutyl)diethylamine or quarternary ammonium salts thereof.

[Chem. 8]

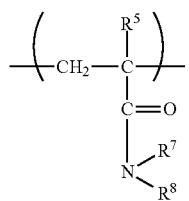

(8)

Wherein $R^5$ represents a hydrogen atom or a methyl group; $R^7$ represents a hydrogen atom, a methyl group, an ethyl group, an n-propyl group or an i-propyl group; and $R^8$ represents a hydrogen atom, a methyl group or an ethyl group.

Examples of the cationic monomers capable of forming the structural unit represented by the general formula (8) may include (meth)acrylamide, N-methyl(meth)acrylamide, N-ethyl(meth)acrylamide, N,N-dimethyl(meth)acrylamide, and the like.

(Ionic Vinyl Alcohol Polymer Having Cation Exchange Group)

The ionic vinyl alcohol polymer having a cation exchange group (sometimes referred to as an anionic polymer) used in the present invention is a copolymer having a cation exchange group (sometimes referred to as an anionic group) in the molecule. The anionic group may be in any portion, such as in main chain, in side chain, or at a terminal end. As the anionic group there may be exemplified a sulfonate group, a carboxylate group, a phosphonate group and the like. Further, the anionic groups may include functional groups at least partly convertible to a sulfonate group, a carboxylate group, or a phosphonate group in water, such as a sulfonic acid group, a carboxyl group and a phosphonic acid group. Among them, from the viewpoint of high ionic dissociation constant, the preferable anionic group includes a sulfonate group. The anionic polymer may contain single species of anionic group, or may contain a plurality of species of anionic groups. There is no particular limitation with respect to counter ions for the anionic groups. Examples of counter cations for anionic groups may include a hydrogen ion, an alkali metal ion and others. Among them, in view of less corrosion problems of the equipment, the counter cation may be preferably an alkali metal ion. The anionic polymer may contain single species of counter cation, or may contain a plurality of species of counter cations.

The anionic polymer may be a copolymer at least comprising a vinyl alcohol structural unit and an anionic group-containing structural unit, and if necessary, may further comprise a structural unit without the anionic group. In addition, the polymer may be preferably crosslinkable. The anionic polymer may be a single species of anionic polymer, or comprise a plurality of species of anionic polymers.

As long as it does not inhibit the effect of the invention, these anionic polymers may be used in combination with and a polymer other than the anionic polymer. Herein a polymer other than the anionic polymer is preferably not a cationic polymer.

As the preferable anionic polymer, there may be exemplified a polymer comprising a vinyl alcohol structural unit and a structural unit represented by the following general formula (9) and a polymer comprising a vinyl alcohol structural unit and a structural unit represented by the following general formula (10).

[Chem. 9]

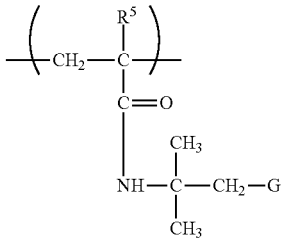

(9)

Wherein $R^5$ represents a hydrogen atom or a methyl group; G represents —SO$_3$H, —SO$_3$$^-$M$^+$, —PO$_3$H, —PO$_3$$^-$M$^+$, —CO$_2$H or —CO$_2$$^-$M$^+$; M$^+$ represents an ammonium ion or an alkali metal ion.

Examples of the anionic monomers capable of forming the structural unit represented by the general formula (9) may include 2-acrylamido-2-methylpropanesulfonic acid, and others.

[Chem. 10]

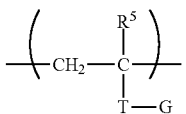

(10)

Wherein $R^5$ represents a hydrogen atom or a methyl group; T represents a phenylene or naphthylene group in which a hydrogen atom therein may be substituted with a methyl group; and G has the same meaning as defined in the general formula (9).

Examples of the anionic monomers represented by the general formula (10) may include a p-styrenesulfonic acid salt such as p-styrenesulfonate sodium salt.

Further, as the anionic monomers, there may be exemplified a sulfonic acid such as vinylsulfonic acid or (meth) allylsulfonic acid or salts thereof; a dicarboxylic acid or derivative or salt thereof such as fumaric acid, maleic acid, itaconic acid, maleic anhydride, itaconic anhydride and the like; and others.

In the general formulae (9) or (10), G is preferably a group capable of providing higher charge density, such as a sulfonate group, a sulfonic acid group, a phosphonate group, or a phosphonic acid group. As the alkali metal ion represented by $M^+$ in the general formulae (9) and (10), there may be mentioned a sodium ion, a potassium ion, a lithium ion, and the like.

The saponification degree of the ionic vinyl alcohol polymer having an ion exchange group is not particularly limited to a specific one as long as the polymer can form an ion exchange membrane. The saponification degree may be, for example, 40 to 99.9% by mole. Where the saponification degree is too low, there is a possibility that the durability of the ion exchanger may be insufficient because of reduced crystallinity. The saponification degree may be preferably 60% by mole or higher, more preferably 80% by mole or higher, more preferably 90% by mole or higher, particularly preferably 95% by mole or higher. The saponification degree is usually 99.9% by mole or lower. Where the vinyl alcohol polymer is a mixture of a plurality of species of vinyl alcohol polymers, the saponification degree is a value measured according to JIS K6726. It is preferred that the vinyl alcohol polymer without ionic group to be used in the present invention also have a saponification degree within the above range.

The viscosity average degree of polymerization (hereinafter sometimes simply referred to as polymerization degree) of the vinyl alcohol polymer containing an ionic group is not particularly limited to a specific one. The ionic group-containing vinyl alcohol polymer may have a polymerization degree of preferably 50 to 10,000. Where the polymerization degree is less than 50, there is a possibility that the ion exchanger cannot hold a sufficient durability in practical use. The preferable polymerization degree is 100 or more. If the polymerization degree exceeds 10,000, an aqueous solution containing such a polymer may have too high viscosity to have a good handleability. It is more preferable that the polymerization degree is 8,000 or less. Where the vinyl alcohol polymer is a mixture of a plurality of types of vinyl alcohol polymers, the polymerization degree is an average polymerization degree as a whole mixture. It should be noted that the polymerization degree of the vinyl alcohol polymer is a value measured according to JIS K6726. It is preferred that the vinyl alcohol polymer without ionic group to be used in the present invention also have a polymerization degree within the above range.

(Copolymer of Cationic Group-Containing Monomer with Vinyl Alcohol Monomer)

As a preferable vinyl alcohol copolymer having a cationic group, from the viewpoint easy availability, there may be mentioned a copolymer of a unit of a methacrylamide alkyltrialkylammonium salt and a vinyl alcohol unit, a copolymer of a unit of a vinylbenzyltrialkylammonium salt and a vinyl alcohol unit, a copolymer of a unit of a diallyldialkylammonium salt and a vinyl alcohol unit, and other copolymers.

It should be noted that in the cationic group-containing vinyl alcohol polymer or in a mixture of the cationic group-containing vinyl alcohol polymer and a vinyl alcohol polymer without cationic group, the proportion of vinyl alcohol units based on the total monomer units in the cationic polymer may be preferably 50% by mole or more, and more preferably 55% by mole or more. Herein a polymer other than the cationic polymer (vinyl alcohol polymer without cationic group) is preferably not an anionic polymer.

(Copolymer of Anionic Group-Containing Monomer with Vinyl Alcohol Monomer)

As a preferable anionic group-containing vinyl alcohol copolymer, from the viewpoint easy availability, there may be mentioned a copolymer of a unit of 2-acrylamido-2-methylpropanesulfonic acid salt and a vinyl alcohol unit, a copolymer of a unit of p-styrenesulfonic acid salt and a vinyl alcohol unit, and other copolymers.

It should be noted that in the anionic group-containing vinyl alcohol polymer or in a mixture of the anionic group-containing vinyl alcohol polymer and a vinyl alcohol polymer without anionic group, the proportion of vinyl alcohol units based on the total monomer units in the anionic polymer may be preferably 50% by mole or more, and more preferably 55% by mole or more. Herein a polymer other than the anionic polymer (vinyl alcohol polymer without anionic group) is preferably not a cationic polymer.

(Block Copolymer)

According to the present invention, the ionic vinyl alcohol polymer comprises a copolymer comprising a cationic group- or anionic group-containing monomer unit and a vinyl alcohol monomer unit. The ionic vinyl alcohol polymer may be a random copolymer of a vinyl alcohol monomer (A-1) and an ion exchange monomer (A-2), preferably a block copolymer comprising a vinyl alcohol copolymer component (a-1) and a copolymer component (a-2) of polymerized cationic group- or anionic group-containing monomer unit. In this way, the ionic vinyl alcohol polymer can be in the state of micro-phase separation between the vinyl alcohol copolymer component (or polymer block) and the ion exchange copolymer component (or polymer block) so as for the vinyl alcohol polymer unit to serve the function of suppression of swelling and retention of membrane shape and so as for the ion exchange polymer unit to serve the function of transmitting cations or anions. As a result, both swelling control and dimensional stability can be achieved in the ion exchange membrane. As the cationic group- or anionic group-containing monomer unit, there may be exemplified units such as those represented by the general formulae (1) to (10). Among them, from the viewpoint of easy availability, preferable cationic polymers include a block copolymer containing a polyvinyl alcohol block and a polymer block obtained by polymerization of a methacrylamide alkyltrialkylammonium salt, a block copolymer containing a polyvinyl alcohol block and a polymer block obtained by polymerization of a vinylbenzyltrialkylammonium salt, or a block copolymer containing a polyvinyl alcohol block and a polymer block obtained by polymerization of a diallyldialkylammonium salt. Also, preferable anionic polymers include a block copolymer containing a polyvinyl alcohol block and a polymer block obtained by polymerization of p-styrenesulfonic acid salt, or a block copolymer containing a polyvinyl alcohol block and a polymer block obtained by polymerization of 2-acrylamido-2-methylpropane sulfonic acid salt.

(Production of Random Copolymer)

Where the ion exchange membrane according to the present invention employs a random copolymer for the ionic vinyl alcohol polymer having an ion exchange group selected from a cation exchange group or an anion exchange group, the random copolymer can be obtained by copolymerizing cationic or anionic monomers with vinyl ester monomers, followed by saponifying in a conventional manner to obtain a random copolymer of ionic vinyl alcohol polymer. Any vinyl ester monomers can be used as long as it can be used for radical polymerization. Examples of vinyl ester monomers include vinyl formate, vinyl acetate, vinyl propionate, vinyl valerate, vinyl caprate, vinyl laurate, vinyl stearate, vinyl benzoate, vinyl pivalate, vinyl versatate, and others. Among them, preferred one includes vinyl acetate.

As the method of copolymerizing cationic or anionic monomers and vinyl ester monomers, there may be mentioned known methods such as bulk polymerization, solution polymerization, suspension polymerization, emulsion polymerization, and others. Among these methods, typically employed methods include bulk polymerization carried out in the absence of a solvent, or solution polymerization carried out using a solvent such as an alcohol. As the alcohol used as the solvent in copolymerization reaction using solution polymerization, there may be mentioned a lower alcohol, especially a $C_{1-4}$ alcohol such as methanol, ethanol, propanol or like. As the polymerization initiator used in the copolymerization reaction, there may be mentioned known initiators, for example, azo initiators such as 2,2'-azobis(2,4-dimethy-valeronitrile), 1,1'-azobis(cyclohexane-1-carbonitrile), and 2,2'-azobis(N-butyl-2-methylpropionamide); peroxide initiators such as benzoyl peroxide and n-propyl peroxy carbonate; and others. The polymerization temperature for the copolymerization reaction is not particularly limited to a specific one and is suitably in a range of from 5 to 180° C.

The vinyl ester polymer obtained by copolymerizing cationic or anionic monomers with vinyl ester monomers is then to be subjected to saponification in a solvent according to a known method so as to obtain a vinyl alcohol polymer containing cationic groups or anionic groups.

As the catalyst for saponification of vinyl ester polymer, there may be typically used alkaline substances. Examples of the alkaline substances include alkali metal hydroxides such as potassium hydroxide and sodium hydroxide; and alkali metal alkoxides such as sodium methoxide. The saponification catalyst can be added at one time in the initial stage of the saponification reaction; alternatively a portion of the catalyst can be added in the initial stage of the saponification reaction, and then the remainder can be added in the course of saponification. As the solvent used for the saponification reaction, there may be mentioned methanol, methyl acetate, dimethylsulfoxide, dimethylformamide, and others. Among them methanol is preferred. The saponification reaction can be carried out in any manner of batch system and continuous system. After completion of the saponification reaction, if necessary, the remaining saponification catalyst may be neutralized by a neutralizing agent. The useable neutralizing agents may include organic acids such as acetic acid and lactic acid; ester compounds such as methyl acetate; and the like.

(Production of Block Copolymer)

According to the present invention, the method for producing a block polymer comprising a vinyl alcohol copolymer component (polymer block) and a copolymer component (polymer block) obtained by polymerization of cation exchange or anion exchange monomers is mainly classified into the following two methods, that is, (1) a method producing a predetermined block copolymer in advance and introducing a cationic or anionic group to a specific block; and (2) a method producing a predetermined block copolymer by polymerizing at least one species of cationic monomers or anionic monomers. Among them, preferably method includes, from the viewpoint of industrial facility, (1) a method polymerizing one or more species of monomers in the presence of a vinyl alcohol polymer having a mercapto group at a terminal to obtain a block copolymer, followed by introducing a cationic or anionic group into the one or more species of copolymer components in the block copolymer; and (2) a method radically polymerizing at least one species of cationic monomers or anionic monomers in the presence of a vinyl alcohol polymer having a mercapto group at a terminal. In particular, in view of easy control of species and amount of each unit in the block copolymer, a preferable method includes a method for producing a block copolymer by radically polymerizing at least one species of cationic monomers or anionic monomers in the presence of vinyl alcohol polymer having a mercapto group at a terminal.

For example, a terminal mercapto group-containing vinyl alcohol polymer used for producing the block copolymers can be obtained by using a method described, for example, in JP Laid-open Patent Publication No. 59-187003, and the like. That is, there may be mentioned a method comprising saponifying a vinyl ester polymer obtained by polymerization of vinyl ester monomers (for example, radical polymerization of vinyl acetate) in the presence of a thiol acid. Further, as a method of obtaining a block copolymer by using thus obtained terminal mercapto group-containing vinyl alcohol polymer and ion exchange monomers, there may be mentioned a method described, for example, in JP Laid-open Patent Publication No. 59-189113, and the like. That is, a block copolymer can be obtained by radical-polymerizing ion exchange monomers in the presence of the terminal mercapto group-containing vinyl alcohol polymer. The radical polymerization is carried out in the known method, for example, bulk polymerization, solution polymerization, pearl polymerization (suspension polymerization), emulsion polymerization, and the like, and preferably carried out in a medium being capable of dissolving terminal mercapto group-containing vinyl alcohol polymer such as water and dimethyl sulfoxide as a main component. The polymerization process may be adopted for a batch process, a semi-batch process or a continuous process.

The ion exchange membrane according to the present invention comprises as a primary component a copolymer comprising a copolymer component (a-1) as a polymerization product of a vinyl alcohol monomer (A-1), and a copolymer component (a-2) as a polymerization product of an ion exchange monomer (A-2). If necessary, the copolymer constituting the ionic vinyl alcohol polymer may be used in combination with a nonionic surfactant.

(Production of Ion Exchange Membrane)

The method for producing an ion exchange membrane according to the present invention comprises:

providing a solution of an ionic vinyl alcohol polymer;

applying the solution onto a release film to form a coated fluid layer containing the ionic vinyl alcohol polymer;

overlaying a porous support onto the coated fluid layer, and impregnating at least a part of the porous support with the ionic vinyl alcohol polymer solution to form an impregnated body;

drying the impregnated body in which the porous support is overlaid to be impregnated with the coated fluid layer on the release film; and peeling the release film from the dried impregnated body.

(Preparation of Ionic Vinyl Alcohol Polymer Solution)

More specifically, an ionic vinyl alcohol polymer solution (preferably an aqueous solution) can be prepared by dissolving the ionic vinyl alcohol polymer in a solvent such as water and DMSO.

From the viewpoint of successfully forming an impregnated layer in the porous support, the obtained ionic vinyl alcohol polymer solution may have a viscosity of 300 to 5000 mPa·s, preferably 400 to 4000 mPa·s, and more preferably 500 to 3000 mPa·s. It should be noted that the viscosity indicates a value measured by the method described in Examples below.

The concentration of the solution can be appropriately set depending on the type of ionic vinyl alcohol polymers. The concentration may be, for example, 1 to 50% by mass, preferably 2 to 45% by mass, and more preferably 3 to 40% by mass.

The ionic vinyl alcohol polymer solution may contain, if necessary, an appropriate additive (for example, a nonionic surfactant).

(Formation of Coated Fluid Layer)

Thereafter the resulting ionic vinyl alcohol polymer solution (preferably an aqueous solution) is applied onto a release film with various types of coater such as a bar coater, a gravure coater, a knife coater, and a blade coater to form a coated fluid layer (cast layer). The suitable coated fluid layer can be formed depending on the size of a porous support to be overlaid.

The release film is not particularly limited to a specific one as long as being capable of forming a coated fluid layer having a substantially uniform fluid thickness thereon and being peelable eventually. The usable release film may include a known or conventional release film or sheet (for example, PET films, polyethylene films, silicone sheets, etc.).

The thickness of the coated fluid layer, i.e., the thickness of liquid (or liquid thickness) on a release film, may be, for example, about 300 to 2,000 μm, preferably about 400 to 1,800 μm and more preferably about 500 to 1,500 μm from the viewpoint of successfully forming the impregnated layer inside the porous support.

Also, the liquid thickness may have a thickness of, for example, 3 to 25 times, preferably 4 to 20 times, and more preferably about 5 to 18 times relative to the thickness of the porous support.

After applying, the coated fluid layer is subsequently used to impregnate the porous support without drying.

(Impregnation of Porous Support)

Before drying the coated fluid layer of the ionic vinyl alcohol polymer solution, a porous support is overlaid or superimposed onto the coated fluid layer so as for at least a portion of the porous support to be impregnated with the ionic vinyl alcohol polymer solution to form an impregnated body.

As long as the ion exchange membrane can express predetermined zeta potentials, the impregnation may be carried out under pressure. From the viewpoint of maintaining porosity of the porous support and lowering membrane resistance, it is preferred to carry out impregnation under no pressure.

(Porous Support)

As long as the porous support is capable of forming an ion exchange membrane having a predetermined zeta potential on both sides, the type of porous support is not particularly limited to a specific one. From the viewpoint of achieving a uniform structure in the impregnated layer, the preferred porous support includes a porous support having uniform structure across the thickness direction.

The porous support is not particularly limited to a specific one as long as the ionic vinyl alcohol polymer solution can be impregnated. The porous support can be formed from a polyolefin such as a polypropylene and a polyethylene; a polyesters such as a polyethylene terephthalate (PET), a polytrimethylene terephthalate (PTT), a polybutylene terephthalate (PBT); a vinyl alcohol resin such as a polyvinyl alcohol and an ethylene-vinyl alcohol copolymer; and others.

The porous support has a porous shape having voids or pores inside, and is not particularly limited to a specific one as long as it is possible to form an impregnated layer. The preferred porous support may be, for example, a fiber assembly such as a sheet of a nonwoven fabric (nonwoven fabric sheet) and a synthetic resin fabric (woven or knitted fabric, melted mesh, etc.).

The nonwoven fabric sheet may be a nonwoven fabric formed from continuous fibers. The preferable nonwoven fabric sheet includes a wet-laid nonwoven fabric comprising short cut fibers because it is easier to form an impregnated layer capable of having a desired zeta potential on both sides from such nonwoven fabric. The wet-laid nonwoven fabric can be produced by dispersing and gently agitating subject fibers and a small amount of binder fibers in water to make a uniform slurry, and supplying the slurry to a paper machine having at least one of wires such as a cylinder, a Fourdrinier, and a sloping type to form a sheet.

For example, the species of polymers used for forming the nonwoven fabric sheet (or the species of polymers for the subject fibers) are not particularly limited to a specific one as long as the nonwoven fabric sheet can be impregnated with the ionic vinyl alcohol polymer solution. Examples of polymers may include a polyester (a PET, a PTT, etc.), a polyvinyl alcohol, and others, and particularly preferably a polyvinyl alcohol.

Particularly preferred nonwoven fabric sheet include a wet-laid nonwoven fabric comprising polyvinyl alcohol cut fibers as subject fibers.

On the other hand, the synthetic resin fabric can be a various type of woven or knitted fabrics as long as it may be impregnated with the ionic vinyl alcohol polymer solution. Among them, in terms of providing the enhanced polymer impregnation, the synthetic resin fabric preferably has a mesh structure with a predetermined porosity, in particular the synthetic resin fabric may be a mesh fabric that is melt-bonded at the intersections.

For example, the mesh fabric that is melt bonded at the intersections may be preferably a mesh of a synthetic resin in which a plurality of linear members (or fibrous members) are arranged to cross preferably at an angle of 10 to 90° and melt-bonded at the intersections.

From the viewpoint of giving a predetermined thickness and porosity, the synthetic resin fabric (especially mesh fabric) having a uniform single layer structure in the thickness direction can be produced by preparing a plurality of mesh fabrics produced from melt extrusion or a plurality of open weave fabrics made of synthetic yarns, and then heating the fabrics under pressure.

The porous support may have, from the viewpoint of forming the impregnated layer, a basis weight of, for example, about 10 to 90 $g/m^2$, preferably about 15 to 70 $g/m^2$, and more preferably about 20 to 50 $g/m^2$.

The porous support may have, a thickness of, for example, about 50 to 150 μm, preferably about 60 to 130 μm, and more preferably about 70 to 120 μm.

The porous support preferably has a porosity of 40 to 90%. Where the porous support has a porosity in this range, the resulting ion exchange membrane has good mechanical strength and also is excellent in durability. Where the porosity of the porous support is too low, the ion exchange membrane may have an increased membrane resistance so as to have a possibility that such a membrane may have difficulty in transport of ions and salts. The porosity of the porous support is preferably 50% or higher, and more preferably 55% or higher. In contrast, where the porosity of the porous support is too high, the ion exchange membrane may have a reduced mechanical strength, may cause problems in durability. The porosity of the porous support is preferably 80% or lower, and more preferably 75% or lower.

(Drying Process)

In the drying process, the impregnated body which is impregnated with the coated fluid layer is dried. The drying procedure may be carried out at room temperature or hot-air drying. In order to enhance working efficiency, preferable drying procedure employs a hot air dryer. Where using a hot air dryer, the drying temperature may be, for example, about 50 to 110° C., and preferably about 60 to 90° C.

(Peeling Process)

In the peeling process, the release film is peeled off from the dried impregnated body so as to obtain an ion exchange membrane comprising an ionic vinyl alcohol polymer-impregnated layer (or ion exchange layer) within the porous support.

(Post-Treatment After Formation of Ion Exchange Membrane)

According to the present invention, thus formed ion exchange layer is preferably subjected to a heat treatment. The heat treatment can enhance crystallinity of the vinyl alcohol copolymer component (a-1) so as to increase physical crosslinking sites therein, leading to increase in mechanical strength of the resulting ion exchange membrane. Further, enrichment of cationic groups or anionic groups in the amorphous regions promotes formation of ion exchange path is promoted so as to increase the charge density as well as to improve the counter ion selectivity.

Method of heat treatment is not particularly limited to a specific one, and the heat treatment can be generally carried out using a hot air dryer or others. The heat treatment temperature is not particularly limited to a specific one, and is preferably from 50 to 250° C. Where the heat treatment temperature is lower than 50° C., there is a possibility that increase in mechanical strength of the resulting ion exchange membrane is not sufficient. The temperature is more preferably 80° C. or higher, and more preferably 100° C. or higher. Where the heat treatment temperature is higher than 250° C., there is a possibility that the vinyl alcohol polymer may be fused. More preferably the temperature is 230° C. or lower, and still more preferably 200° C. or lower. The heat treatment is usually carried out for about 1 minute to 10 hours. The heat treatment is preferably carried out under inert gas (for example, nitrogen gas, argon gas, etc.) atmosphere.

After forming the ion exchange layer, it is preferable to perform crosslinking treatment (chemical crosslinking treatment). By carrying out the crosslinking treatment, the mechanical strength of the resulting ion exchange layer is increased. Also, increase in charge density improves counter ion selectivity. A method for crosslinking treatment may be a method in which polymer chains can be bonded with each other by chemical bonding, and is not particularly limited. Typically used methods include a method of immersing the ion exchange layer in a solution containing a crosslinking agent. Examples of the crosslinking agents include glutaraldehyde, formaldehyde, glyoxal, and the like. The typical concentration of crosslinking agent is preferably as a volume concentration of the crosslinking agent relative to the solution in the range of from 0.001 to 10% by volume.

The post-treatment may comprise both heat treatment and crosslinking treatment, or may comprise either one of them. Where carrying out both heat treatment and crosslinking treatment, the order of the treatment is not particularly limited. Although a plurality of treatments may be carried out around the same time, it is preferred that the chemical crosslinking treatment is carried out after the heat treatment. The heat treatment can generate some portions that are unlikely to be crosslinked. Thereafter, by carrying out the crosslinking treatment, especially chemical crosslinking treatment, the ion exchange layer can contain both crosslinked portions and un-crosslinked portions so as to increase the strength of membrane. The particularly preferable process includes one carrying out in the order of heat treatment and crosslinking treatment from the viewpoint of mechanical strength of the resulting ion exchange membrane.

(Ion Exchange Membrane)

As shown in FIG. 1, the ion exchange membrane 1 obtained in the above manner comprises an ionic vinyl alcohol polymer-impregnated layer (or ion-exchange layer) 2 formed inside at least a part of a porous support 3 from one surface of the porous support toward the thickness direction thereof.

Since the ion exchange membrane has a zeta potential value ($\zeta1$) at one surface and a zeta potential value ($\zeta2$) at the other surface, in which these zeta potential values have a relationship represented by the following formula (1), the ion exchange membrane has a reduced potential difference between both surfaces. As a result, electrodialysis reversal operation can be carried out in a state that the ion exchange membranes are used as they are. It should be noted that the zeta potential indicates a value measured by the method described in Examples below.

$$(|\zeta1|-|\zeta2|)/|\zeta1|<0.5 \ (|\zeta1|\geq|\zeta2|) \quad (1)$$

The zeta potentials ($\zeta1$) and ($\zeta2$) may preferably have a relationship represented by the following equation (2).

$$(|\zeta1|-|\zeta2|)/|\zeta1|<0.4 \ (|\zeta1|\geq|\zeta2|) \quad (2)$$

The zeta potentials ($\zeta1$) and ($\zeta2$) may more preferably have a relationship represented by the following equation (3).

$$(|\zeta1|-|\zeta2|)/|\zeta1|<0.3 \ (|\zeta1|\geq|\zeta2|) \quad (3)$$

The zeta potential ($\zeta$) represents a value indicating an electric potential at the slip plane which shows a spreading (thickness) of electrical double layer formed over a surface of the ion exchange membrane. That is, the zeta potential can be used as a criterion for showing movability of ions for inside and outside of the membrane. Where using a cation exchange membrane, the zeta potential ($\zeta$) is made a negative value; where using an anion exchange membrane, the zeta potential ($\zeta$) is made a positive value. As for these values, higher charge density the membrane has, larger absolute value the zeta potential becomes. In the case where an ion exchange layer (or ionic polymer-impregnated layer) formed within the ion exchange membrane which does not sufficiently fulfill inside of the membrane, such a membrane may have an electrical discontinuous space between the surface of the ion exchange layer and the surface of the ion exchange membrane, resulting in inhibition of ion movement between the channel and the ion exchange membrane. In particular, the channel having a low ion concentration leads to increase the membrane resistance.

Also, the ion exchange membrane preferably has a membrane resistance of, in order to exhibit a sufficient current efficiency for use as ion-exchange membranes for electrodialysis, for example, 100 $\Omega cm^2$ or lower, preferably 50 $\Omega cm^2$ or lower, and more preferably 30 $\Omega cm^2$ or lower. Herein the membrane resistance indicates a value measured by the method described in Examples below.

The ion exchange membrane preferably has a dynamic transport number, in order to exhibit sufficient ion exchange properties for use as ion-exchange membranes for electrodialysis, for example, 0.90 or higher, more preferably 0.95 or higher, and particularly preferably 0.98 or higher.

Herein, the dynamic transport number indicates a value measured by the method described in Examples below.

(Application of Ion Exchange Membrane)

The ion exchange membrane according to the present invention can be used in various applications. For example, the ion exchange membrane according to the present invention having an ion exchange layer comprising any one of a cationic polymer or an anionic polymer is excellent in organic fouling resistance, has reduced membrane resistance, and is capable of conducting stable electrodialysis efficiently for a long period of time. Accordingly, such ion exchange membranes are suitably used for desalination of organic materials (for example, food, pharmaceutical raw materials), desalination of whey, concentration of salts, desalination of molasses, desalination of seawater or brine, desalination of tap water, softening of water, and others. In general, the ion exchange membrane is particularly preferably used as an anion exchange membrane which is susceptible to cause severe organic fouling.

In particular, since the ion exchange membrane according to the present invention comprises a polyvinyl alcohol unit, the membrane is excellent in resistance against organic fouling. Further, since the ion exchange membrane has zeta potential values with a specific relationship between the front and back surfaces, it is possible to suppress the ion concentration polarization in the ion exchange membrane at the time of electrodialysis. Such an ion exchange membrane can improve the current efficiency of electrodialysis, and can be applicable to various electric dialyzers.

(Electrodialyzer)

The electrodialyzer according to the present invention at least comprises:

an anode and a cathode; and a desalting compartment and a concentration compartment each formed by alternately arranging anion exchange membranes and cation exchange membranes between the anode and the cathode, wherein the anion exchange membrane and the cation exchange membrane each includes the above-mentioned ion exchange membrane according to the present invention.

The ion exchange membrane according to the present invention has a small difference in zeta potential across two opposing surfaces of the membrane. Accordingly, either surface, a front surface or a back surface, can be placed toward a side of the desalting compartment. Preferably, a membrane surface having a larger absolute zeta potential value is placed toward a side of the desalting compartment.

In the electrodialyzer according to the present invention, since the ion exchange membrane has small difference in resistance across two opposing surfaces, the electrodialyzer can be satisfactorily used particularly as an electrodialysis reversal apparatus.

Figure 2:
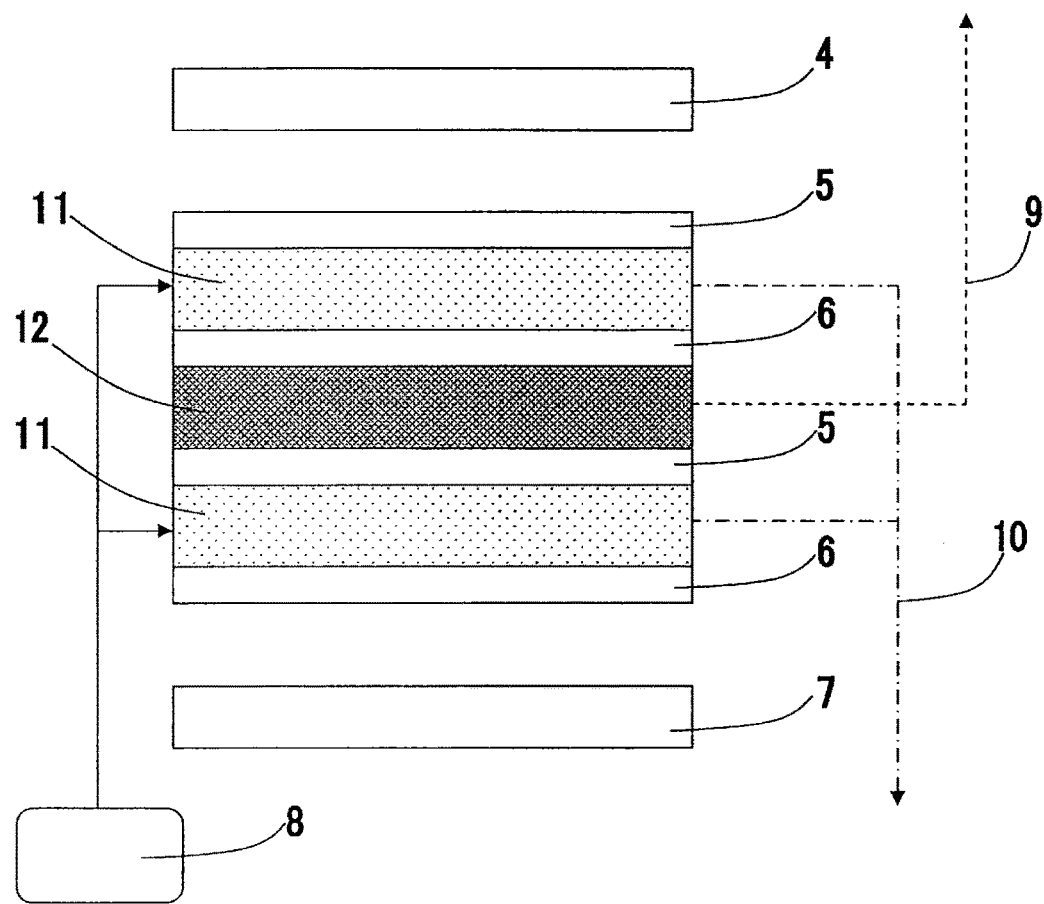
FIG. 2 is a schematic view for illustrating an electrodialyzer which uses an ion exchange membrane according to one embodiment according to the present invention.

FIG. 2 shows a schematic view of an electrodialyzer as one embodiment according to the present invention. The electrodialyzer includes electrodes 4 and 7, and anion exchange membranes 5 and cation exchange membranes 6 each alternately arranged between the electrodes 4 and 7. During a normal phase operation, the anion exchange membranes 5 and the cation exchange membranes 6 are alternately arranged one by one between the anode 4 and the cathode 7, so that desalting compartments and concentration compartments are alternately formed. A liquid to be treated is supplied from a liquid-to-be-treated tank 8 to desalting compartments 11 and 11. When a voltage is applied to the electrodes at opposite ends of the electrodialyzer, cations and anions in the desalting compartments 11 and 11 move to the cathode side and the anode side, respectively. A desalted liquid 10 is discharged from the desalting compartment, and a concentrated liquid 9 is discharged from a concentration compartment 12.

When the electrodialyzer is an electrodialysis reversal type electrodialyzer, deposits on ion exchange membranes (particularly anion exchange membranes) can be removed by reversing the anode and the cathode to each other during a reverse phase operation so as to carry out self-cleaning.

For example, in an electrodialyzer in which the ion exchange membranes according to the present invention are used as an anion exchange membrane and/or a cation exchange membrane in a cell, the cell may have a ratio between cell resistances R2/R1 of for example, 7 or less, preferably 5 or less, and more preferably 3 or less, wherein R1 is a cell resistance at 10 minutes after starting electrodialysis treatment where a surface having a higher zeta potential of the ion exchange membrane is placed toward a desalting compartment; and R2 is a cell resistance at 10 minutes after starting electrodialysis treatment where a surface having a higher zeta potential of the ion exchange membrane is placed toward a concentration compartment.

It should be noted that R1 and R2 show values measured by the method described in Examples as described later.

EXAMPLES

The present invention will be described in detail below by way of examples. In examples and comparative examples below, "%" and "part(s)" are based on the mass unless otherwise specified. Analyses and evaluations in examples and comparative examples were performed in accordance with the following methods.

(1) Measurement of Zeta Potential

The zeta potential of an ion exchange membrane was measured at pH of 7 and a temperature of 25° C. using a zeta potential/particle size measuring system "ELS-Z2" (manufactured by Otsuka Electronics Co., Ltd.) with a flat plate cell. A fragment (16 mm×37 mm) of the obtained ion exchange membrane was brought into close contact with the flat plate cell, and a dispersion liquid with monitoring particles (polystyrene particles coated with hydroxypropyl cellulose manufactured by Otsuka Electronics Co., Ltd.) dispersed in a 10 mM sodium chloride (NaCl) solution was injected into the cell. Electrophoresis of monitoring particles was performed at each level in the cell depth direction, and the zeta potential was measured. Electrophoresis was performed under the condition of an applied voltage of 60 V.

(2) Measurement of Dynamic Transport Number

Figure 3:
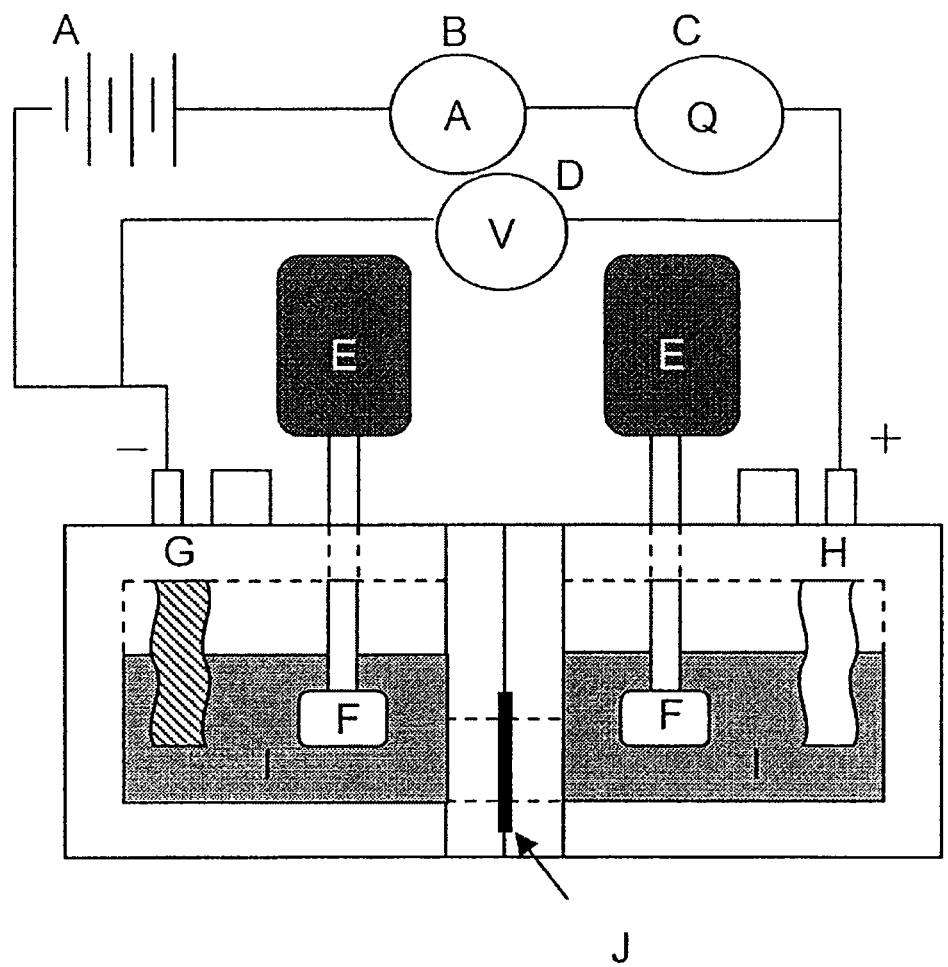
FIG. 3 is a schematic view of a device for testing the dynamic transport number of an ion exchange membrane.

As for measuring the dynamic transport number of the ion exchange membrane, an ion exchange membrane was held in two-compartment cell each having a platinum black electrode plate as shown in FIG. 3, the two-compartment cell was filled with a 0.5 mol/L-NaCl solution on both sides of the ion exchange membrane, and electrodialysis was carried out at a predetermined current density (J=10 mAcm$^{-2}$) for a predetermined time (t). The effective membrane area was 8.0 cm$^2$ (2 cm×4 cm). Thereafter, the measurement solution was taken out, and the solution was diluted in a 300 mL measuring flask. The conductivity of the diluted solution was measured by a conductivity meter, a movement equivalent was determined from the obtained conductivity and a calibration curve prepared beforehand, and the movement equivalent was assigned in the following equation to calculate a dynamic transport number $t_{d\pm}$.

$$t_{d\pm} = \Delta m/E_a$$

Figure 4:
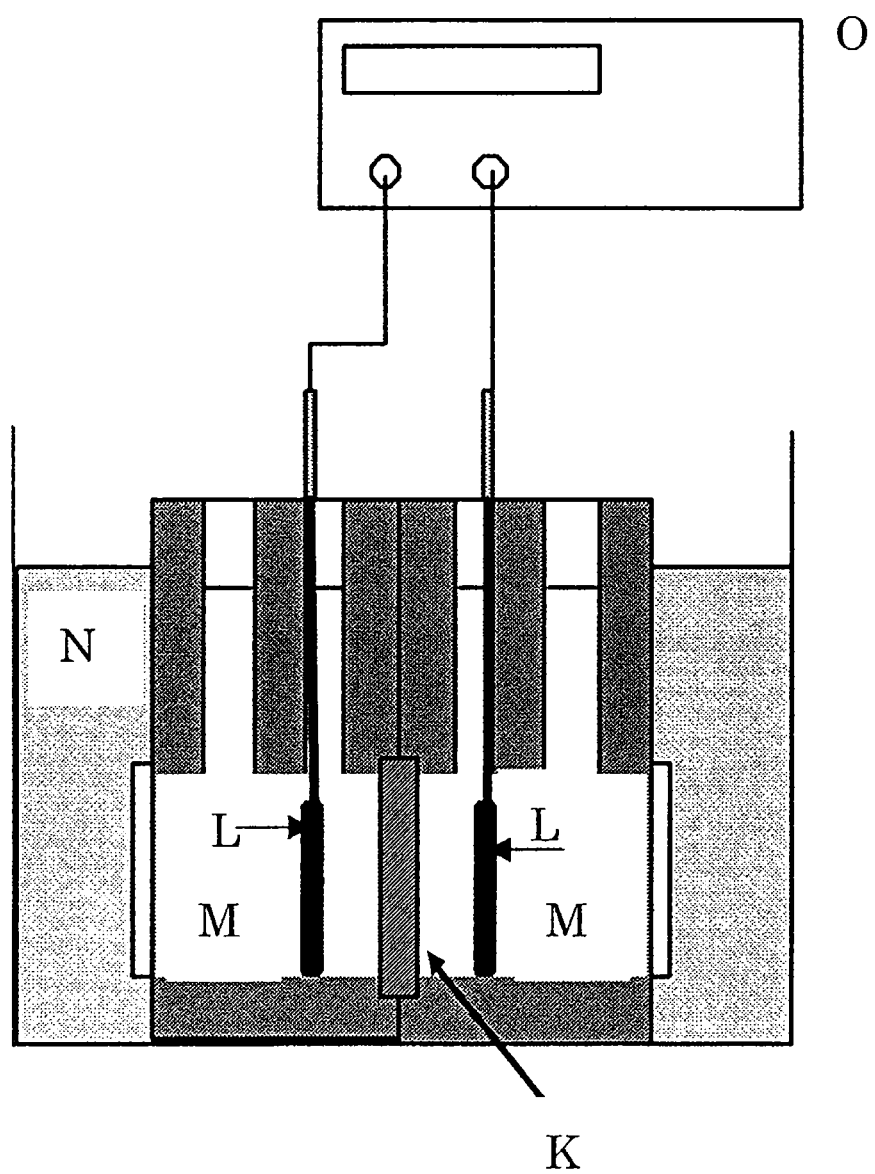
FIG. 4 is a schematic view of a device for testing the membrane resistance of an ion exchange membrane.

$t_{d±}$: dynamic transport number
$E_a$: theoretical equivalent amount=$1\times t/F$
$\Delta m$: moved equivalent
F: Faraday constant (3) Measurement of Membrane Resistance As for electrical resistance of membrane, an ion exchange membrane was interposed between compartments which constitute two-compartment cell, each of the compartments comprising a platinum black electrode plate as shown in FIG. 4, and a NaCl solution (0.5 mol/L) was filled into the two compartments so as for both sides of the membrane to be filled with. Resistance between the electrodes was measured at 25° C. with operating AC bridge (frequency: 1,000 cycles/sec) under each condition with or without the ion exchange membrane. Difference in resistance under the conditions between with and without the ion exchange membrane was calculated. It should be noted that the membrane used in the above measurement was conditioned in a NaCl solution (0.5 mol/L) in advance so as to be reached in equilibrium.

(4) Measurement of Porosity of Porous Support

By measuring basis weight and thickness of the porous support, porosity of the porous support is calculated by the following equation:

Porosity (%)={1−[basis weight (g/m$^2$)/ thickness (μm)]/resin density (g/cm$^3$)}×100

Wherein the resin density of the used porous support was determined as 1.3 (g/cm$^3$).

(5) Viscosity Measurement

The viscosity (mPa·s) of an aqueous polymer solution was determined by measuring a viscosity at 20° C. at a rotor speed of 60 rpm using a B-type viscometer (Tokyo Keiki Co., Ltd.).

[Synthesis of Cationic Polymer P-1]

Into a separable flask (6 L) equipped with a stirrer, a temperature sensor, a dropping funnel and a reflux condenser, were put 2,450 g of vinyl acetate, 1,030 g of methanol, and 69 g of a methanol solution containing 20 mass % of methacrylamidopropyltrimethylammonium chloride, and then the reaction system was purged with nitrogen with stirring, followed by increasing internal temperature to 60° C. Into the reaction mixture, was added 20 g of methanol containing 0.8 g of 2,2′-azobisisobutyronitrile (AIBN) to initiate polymerization reaction. From the starting point of the polymerization reaction, 183 g of a methanol solution containing 20 mass % of methacrylamidopropyltrimethylammonium chloride was successively added into the reaction mixture to carry out polymerization reaction for 4 hours, and then the polymerization reaction was stopped. The solid content concentration in the reaction system at the time of stopping the reaction, i.e., the proportion of the non-volatile matters in the entire polymerization reaction mixture was 17.8% by mass. Thereafter, by introducing methanol vapor into the reaction system, unreacted vinyl acetate monomers were purged to obtain a methanol solution containing 55 mass % of vinyl ester copolymer.

Into the methanol solution containing 55 mass % of the vinyl ester copolymer, were added methanol and a methanol solution containing 10 mass % of sodium hydroxide in this order with stirring so that the solution had a molar ratio of sodium hydroxide relative to vinyl ester units in the copolymer of 0.02 and that a solid content concentration of the vinyl acetate copolymer was 30 mass %. Thereafter saponification reaction was initiated at 40° C.

Immediately after forming a gel-like material along with the progress of saponification reaction, the gel-like material was taken out from the reaction system and crushed. Subsequently, one hour after the formation of the gel-like material, was added methyl acetate to the crushed material to carry out neutralization so as to obtain a solid material in a swollen state. Into the swollen anionic polymer, was added methanol in an amount of 6 times on mass basis (bath ratio of 6 times), followed by washing the resultant for 1 hour under reflux to collect a solid material by filtration. The collected solid material was dried for 16 hours at 65° C. to obtain a cationic polymer which is a random copolymer of vinyl alcohol and methacrylamidopropyltrimethylammonium chloride. Thus obtained polymer was dissolved in heavy water to be subjected to $^1$H-NMR measurement at 400 MHz. As a result, the obtained cationic polymer had a content of cationic monomer units in the cationic polymer, i.e., a ratio of methacrylamidopropyltrimethylammonium chloride monomer units based on the total monomer units in the cationic polymer of 2% by mole. The cationic polymer had a polymerization degree of 1,700 and a saponification degree of 98.5% by mole.

(Synthesis of Anionic Polymer P-2)

Except for changing, as shown in Table 1, the polymerization conditions such as the initial charge of vinyl acetate, the initial charge of methanol (MeOH), the type and initial charge of the ion exchange monomer, the amount of the polymerization initiator (AIBN), the successive additional amount of the ion exchange monomer, and the saponification conditions, an anionic polymer P-2 was obtained in the same manner as the synthesis of the cationic polymer P-3. The physical properties of the anionic polymer P-2 is shown in Table 1.

[Production of Polyvinyl Alcohol Having a Mercapto Group at its Terminal (PVA-1)]

By the method described in JP Laid-open Patent Publication No. 59-187003, was synthesized a polyvinyl alcohol copolymer having a mercapto group at its terminal (PVA-1). The obtained polyvinyl alcohol copolymer had a polymerization degree of 1,550 and a saponification degree of 98.5%.

TABLE 1

| | | Polymerization condition | | | | | | Saponification condition | | | | Cationic or anionic polymer | |
|---|---|---|---|---|---|---|---|---|---|---|---|---|---|
| | | Ionic group-containing monomer | | | MeOH | | | | | | | | Cationic or anionic |
| | Vinyl acetate (g) | Species | MeOH solution conc. (%) | Initial charged amount (g) | Successive charged amount (g) | Initial charged amount (g) | Initiator (AIBN) (g) | Polymerization time (hr) | Solid conc. (mass %) | conc. (mass %) | NaOH molar ratio | Saponification degree (mol %) | Polymerization degree | monomer content (mol %) |
| P-1 | 2450 | MAPTAC[1] | 20 | 69 | 183 | 1050 | 0.8 | 4 | 17.8 | 30 | 0.02 | 98.5 | 1700 | 2 |
| P-2 | 2450 | AMPS[2] | 25 | 34 | 158 | 1050 | 0.8 | 4 | 17.9 | 30 | 0.02 | 98.5 | 1700 | 2 |

[1]MAPTAC: methacrylamidopropyltrimethylammonium chloride
[2]AMPS: 2-acrylamido-2-methylpropanesulfonic acid sodium salt

[Synthesis of Cationic Polymer P-3]

Into a four-necked separable flask (5 L) equipped with a reflux condenser and a stirring blade, were charged 1,900 g of water, 344 g of PVA-1 as the vinyl alcohol polymer having a mercapto group at a terminal, followed by heating the mixture with stirring to 95° C. so as for the vinyl alcohol polymer to be dissolved in water, and then cooling the solution to a room temperature. The solution was adjusted to have a pH of 3.0 by adding sulfuric acid (0.5 N) into the solution. Separately, 179 g of vinylbenzyltrimethylammonium chloride is dissolved in 300 g of water, and the obtained solution was successively added with stirring to the former aqueous solution having a pH of 3.0, followed by heating the resultant solution to 70° C. with bubbling nitrogen into the solution, and further keeping the temperature at 70° C. with bubbling nitrogen for 30 minutes so as to purge the reaction system with nitrogen. After purging, 121 mL of a 2.5% potassium persulfate (KPS) aqueous solution was successively added to the aqueous solution for 1.5 hours to initiate and proceed block copolymerization, followed by further polymerization for 1 hour with maintaining the inside temperature at 75° C. Subsequently, the resultant was cooled to obtain an aqueous solution of cationic polymer P-3 being a block copolymer of polyvinyl alcohol and poly(vinylbenzyltrimethylammonium chloride) in a solid content concentration of 18%. A part of the resulting aqueous solution was dried and then dissolved in heavy water to be subjected to $^1$H-NMR measurement at 400 MHz. As a result, the obtained cationic polymer had a content of cationic monomer unit in the block copolymer, i.e., a ratio of vinylbenzyltrimethylammonium chloride monomer units based on the total monomer units in the polymer of 10% by mole. Table 2 shows the physical properties of the cationic polymer P-3.

[Synthesis of Cationic Polymers P-4 and P-5]

Except for changing, as shown in Table 2, polymerization conditions such as the type and initial charge of the polyvinyl alcohol copolymer having a mercapto group at its terminal, the type and initial charge of the cationic monomer, the amount of water, and the amount of the polymerization initiator (potassium persulfate), cationic polymers P-4 and P-5, both being block copolymers, were synthesized in the same manner as the synthesis of the cationic polymer P-3. Table 2 shows the physical properties of the cationic polymers P-4 and P-5.

[Synthesis of Anionic Polymer P-6]

Into a four-necked separable flask (5 L) equipped with a reflux condenser and a stirring blade, were charged 1,900 g of water, 344 g of PVA-1 as the vinyl alcohol polymer having a mercapto group at a terminal, followed by heating the mixture with stirring to 95° C. so as for the vinyl alcohol polymer to be dissolved in water, and then cooling the solution to a room temperature. The solution was adjusted to have a pH of 3.0 by adding sulfuric acid (0.5 N) into the solution. Separately, 172 g of p-styrenesulfonic acid sodium salt is dissolved in 300 g of water, and the obtained solution was added with stirring to the former aqueous solution having a pH of 3.0, followed by heating the resultant solution to 70° C. with bubbling nitrogen into the solution, and further keeping the temperature at 70° C. with bubbling nitrogen for 30 minutes so as to purge the reaction system with nitrogen. After purging, 121 mL of a 2.5% potassium persulfate (KPS) aqueous solution was successively added to the aqueous solution for 1.5 hours to initiate and proceed block copolymerization, followed by further polymerization for 1 hour with maintaining the inside temperature at 75° C. Subsequently, the resultant was cooled to obtain an aqueous solution of anionic polymer P-6 being a block copolymer of polyvinyl alcohol and poly(p-styrenesulfonic acid sodium salt) in a solid content concentration of 18%. A part of the resulting aqueous solution was dried and then dissolved in heavy water to be subjected to $^1$H-NMR measurement at 400 MHz. As a result, the obtained anionic polymer had a content of anionic monomer unit in the block copolymer, i.e., a ratio of p-styrenesulfonic acid sodium salt monomer units based on the total monomer units in the polymer of 10% by mole. Table 3 shows the physical properties of the anionic polymer P-6.

[Synthesis of Anionic Polymers P-7 and P-8]

Except for changing, as shown in Table 3, polymerization conditions such as the type and initial charge of the polyvinyl alcohol copolymer having a mercapto group at its terminal, the type and initial charge of the anionic monomer, the amount of water, and the amount of the polymerization initiator (potassium persulfate), anionic polymers P-7 and P-8, both being block copolymers, were synthesized in the same manner as the synthesis of the cationic polymer P-6. Table 3 shows the physical properties of the anionic polymers P-7 and P-8.

TABLE 2

| | Polymerization condition | | | | | | | | Block copolymer | |
| --- | --- | --- | --- | --- | --- | --- | --- | --- | --- | --- |
| | PVA polymer | | Cationic monomer | | | Polymerization | | | Solid | | Cationic |
| | | Charged | | Charged | | initiator (KPS) | | Polymerization | content | Viscosity | monomer |
| | Type | amount (g) | Type | amount (g) | Water (g) | Concentration (mass %) | Amount (mL) | period (hr) | conc. (mass %) | at 4% (mPa · s) | content (mol %) |
| P-3 | PVA-1 | 344 | VTMAC[1] | 179 | 2200 | 2.5 | 121 | 1.5 | 18 | 18 | 10 |
| P-4 | PVA-1 | 344 | DADMAC[2] | 134 | 2000 | 2.5 | 121 | 1.5 | 18 | 18 | 10 |
| P-5 | PVA-1 | 344 | MAPTAC[3] | 92 | 1800 | 2.5 | 121 | 1.5 | 18 | 18 | 5 |

[1]VTMAC: vinylbenzyltrimethylammonium chloride
[2]DADMAC: diallyldimethylammonium chloride
[3]MAPTAC: 3-(methacrylamido)propyltrimethylammonium chloride

TABLE 3

| | Polymerization condition | | | | | | | | Block copolymer | |
|---|---|---|---|---|---|---|---|---|---|---|
| | PVA polymer | | Anionic monomer | | | Polymerization initiator (KPS) | | Polymerization | Solid content | Viscosity | Anionic monomer |
| Type | Type | Charged amount (g) | Type | Charged amount (g) | Water (g) | Concentration (mass %) | Amount (mL) | period (hr) | conc. (mass %) | at 4% (mPa · s) | content (mol %) |
| P-6 | PVA-1 | 344 | PStSS[1] | 172 | 2200 | 2.5 | 121 | 1.5 | 18 | 18 | 10 |
| P-7 | PVA-1 | 344 | AMPS[2] | 190 | 2200 | 2.5 | 121 | 1.5 | 18 | 18 | 10 |
| P-8 | PVA-1 | 344 | AMPS[2] | 95 | 1800 | 2.5 | 121 | 1.5 | 18 | 18 | 5 |

[1] PStSS: p-styrenesulfonic acid sodium salt
[2] AMPS: 2-acrylamido-2-methylpropanesulfonic acid sodium salt

[Preparation of Anion Exchange Membrane AEM-1]

An aqueous solution of the polymer P-1 having a concentration of 12 wt % was prepared using deionized water. The polymer solution was placed onto a PET film so as to obtain a coated fluid layer (cast layer) having a liquid thickness of 800 μm using a bar coater. Thereafter, a vinylon paper (basis weight: 36 g/m$^2$, thickness: 90 μm, porosity: 67%) was overlapped into the cast layer on the PET film to make the vinylon paper to be impregnated with the P-1 solution. Then, the resultant vinylon paper impregnated with the P-1 solution was dried for 30 minutes at 80° C. in a hot air drier DKM400 (manufactured by Yamato Scientific Co., Ltd.), followed by peeling off the PET film to obtain a polymer-impregnated film. Thus obtained film was heat-treated at 160° C. for 30 minutes to form physical crosslinks. Then, the film was immersed in an aqueous electrolyte solution of sodium sulfate (2 mol/L) for 24 hours. After adding concentrated sulfuric acid into the aqueous electrolyte solution until the solution had a pH of 1, the film was immersed in a 0.05% by volume of glutaraldehyde aqueous solution, and crosslinking treatment was carried out at 25° C. with stirring for 24 hours. Herein, as the glutaraldehyde aqueous solution, was used a water-diluted solution of "glutaraldehyde" (25 vol %) produced by Ishizu Chemicals Co., Ltd. After the crosslinking treatment, the film was immersed in deionized water. With exchanging the deionized water several times, the film was immersed therein until reaching to swelling equilibrium so as to obtain an anion exchange membrane.

[Evaluation of Ion Exchange Membrane]

Thus obtained anion exchange membrane produced in this manner was cut into a desired size to obtain a measurement sample. With thus obtained sample, measurements were carried out for zeta potential, membrane resistance, and dynamic transport number. Table 4 shows the obtained results.

TABLE 4

| | | Cationic polymer solution | | Substrate | | | | Liquid | Zeta potential (mV) | | | Membrane | Dynamic transport number |
|---|---|---|---|---|---|---|---|---|---|---|---|---|---|
| Anion exchange membrane | Cationic polymer | Conc. of polymer aqueous solution (mass %) | Viscosity of polymer aqueous solution (mPa · s) | Type | Basis weight (g/m$^2$) | Thickness (μm) | Density (g/cm$^3$) | Porosity (%) | Thickness (μm) | $\zeta 1$ | $\zeta 2$ | $(|\zeta 1|) - |\zeta 2|)/|\zeta 1|$ | resistance ($\Omega$cm$^2$) | td— (—) |
| AEM-1 | P-1 | 12 | 780 | Vinylon paper | 36 | 90 | 0.40 | 67 | 800 | 2.3 | 2 | 0.13 | 38 | 0.91 |
| AEM-2 | P-3 | 12 | 800 | Vinylon paper | 36 | 90 | 0.40 | 67 | 800 | 9.9 | 8.8 | 0.11 | 5 | 0.98 |
| AEM-3 | P-3 | 12 | 800 | Vinylon paper | 36 | 90 | 0.40 | 67 | 700 | 9.9 | 6.6 | 0.33 | 4.6 | 0.98 |
| AEM-4 | P-3 | 12 | 800 | Vinylon paper | 36 | 90 | 0.40 | 67 | 400 | 9.9 | 5.3 | 0.46 | 4.1 | 0.98 |
| AEM-5 | P-4 | 12 | 780 | Polyester mesh | 15 | 80 | 0.19 | 85 | 800 | 9.5 | 8.8 | 0.07 | 2.3 | 0.96 |
| AEM-6 | P-5 | 12 | 780 | Vinylon paper | 36 | 90 | 0.40 | 67 | 800 | 5 | 4.5 | 0.10 | 14 | 0.93 |
| AEM-7 | P-3 | 12 | 800 | Polyester paper | 50 | 100 | 0.50 | 60 | 800 | 9.9 | 8.5 | 0.14 | 8 | 0.98 |
| AEM-8 | P-3 | 12 | 800 | Vinylon paper | 36 | 90 | 0.40 | 67 | — | 9.5 | −1 | 0.89 | 3.8 | 0.98 |
| AEM-9 | P-3 | 12 | 800 | Vinylon paper* | — | — | — | — | — | 9.5 | −1 | 0.89 | 3.8 | 0 98 |

*A heat-sealable film of PET/EVA (ethylene-vinyl acetate copolymer) was adhered on the backside surface of the vinylon paper.

[Preparation of Anion Exchange Membranes AEM-2 to AEM-4 and AEM-6]

Except for changing the cationic polymers as shown in Table 4, anion exchange membranes were obtained in the same manner as the preparation of AEM-1 to measure the membrane properties thereof. Table 4 shows the obtained measurement results.

[Preparation of Anion Exchange Membranes AEM-5]

Except for changing the cationic polymer as shown in Table 4, and substrate from the vinylon paper to a polyester mesh formed from polyethylene terephthalate (basis weight: 15 g/m$^2$, thickness: 80 μm, porosity: 85%) anion exchange membranes were obtained in the same manner as the preparation of AEM-1 to measure the membrane properties thereof. Table 4 shows the obtained measurement results.

[Preparation of Anion Exchange Membrane AEM-7]

Except for using the cationic polymer as shown in Table 4, and changing the substrate from the vinylon paper to a polyester mesh formed from polyethylene terephthalate (basis weight: 50 g/m$^2$, thickness: 100 μm, porosity: 60%), an anion exchange membrane was obtained in the same manner as the preparation of AEM-1 to measure the membrane properties thereof. Table 4 shows the obtained measurement results.

[Preparation of Anion Exchange Membrane AEM-8]

An aqueous solution of the polymer P-3 having a concentration of 12 wt % was prepared using deionized water. The polymer solution was coated directly on a vinylon paper (basis weight: 36 g/m$^2$, thickness: 90 μm, porosity: 67%) using a bar coater. Thereafter, the resultant vinylon paper coated with the P-3 solution was dried for 30 minutes at 80° C. in a hot air drier DKM400 (manufactured by Yamato Scientific Co., Ltd.) to obtain a P-3 polymer-coated vinylon sheet. The sheet had an amount of the coated polymer of 15 g/m$^2$ as a dry mass. Thus obtained sheet was heat-treated at 160° C. for 30 minutes to form physical crosslinks. Then, the sheet was immersed in an aqueous electrolyte solution of sodium sulfate (2 mol/L) for 24 hours. After adding concentrated sulfuric acid into the aqueous electrolyte solution until the solution had a pH of 1, the sheet was immersed in a 0.05% by volume of glutaraldehyde aqueous solution, and crosslinking treatment was carried out at 25° C. with stirring for 24 hours. Herein, as the glutaraldehyde aqueous solution, was used a water-diluted solution of "glutaraldehyde" (25 vol %) produced by Ishizu Chemicals Co., Ltd. After the crosslinking treatment, the film was immersed in deionized water. With exchanging the deionized water several times, the film was immersed therein until reaching to swelling equilibrium so as to obtain an anion exchange membrane.

[Evaluation of Ion Exchange Membrane]

Thus obtained anion exchange membrane produced in this manner was cut into a desired size to obtain a measurement sample. With thus obtained sample, measurements were carried out for zeta potential, membrane resistance, and dynamic transport number. Table 4 shows the obtained results.

[Preparation of Anion Exchange Membrane AEM-9]

Figure 5A:
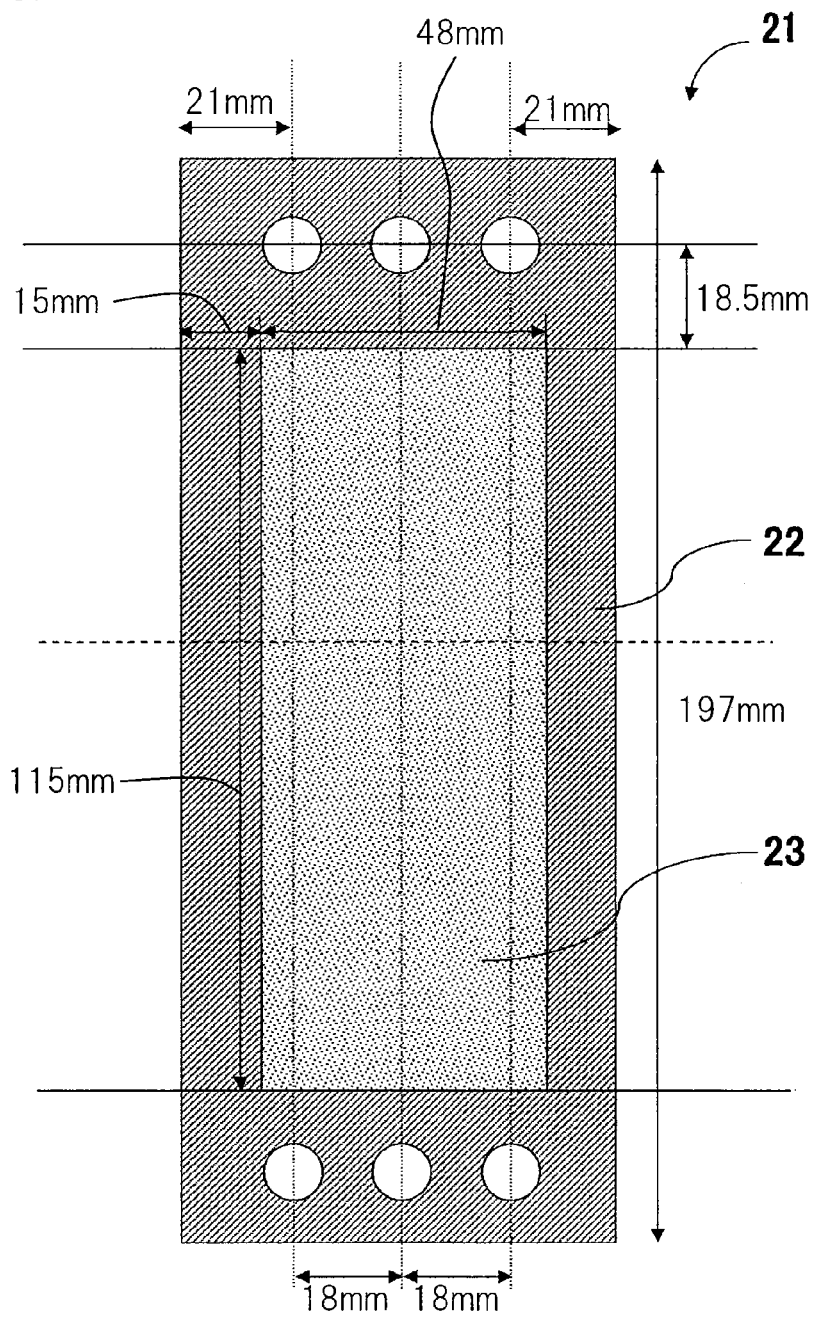
FIG. 5A is a plane view for illustrating the shape of an anode exchange membrane AEM-9.
Figure 5B:
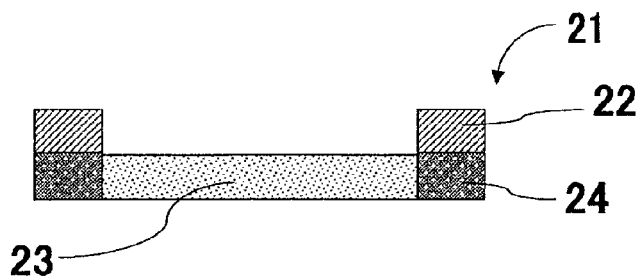
FIG. 5B is a cross-sectional view for illustrating the shape of an anode exchange membrane AEM-9.

As shown in FIGS. 5A and 5B, an anion exchange membrane 21 was prepared in the following manner. FIG. 5A is a plane view of the anion exchange membrane 21; FIG. 5B is a cross-sectional view of the portion indicated by the dashed line of FIG. 5A.

An aqueous solution of the polymer P-3 having a concentration of 12 wt % was prepared using deionized water. The polymer solution was directly coated on a vinylon paper (basis weight: 36 g/m$^2$, thickness: 90 μm, porosity: 67%) using a bar coater. Thereafter, the resultant vinylon paper coated with the P-3 solution was dried for 30 minutes at 80° C. in a hot air drier DKM400 (manufactured by Yamato Scientific Co., Ltd.) to obtain a polymer-coated sheet. The sheet had an amount of the coated polymer of 15 g/m$^2$ as a dry mass. The sheet having the coated layer was cut into a rectangle of 197 mm×78 mm as a sheet 23. Then, as shown in FIG. 5A, was cut a heat-sealable film (CP roll produced by FUJIPLA Inc.) formed from a bilayer film of polyethylene terephthalate (PET)/ethylene-vinyl acetate copolymer (EVA) having an EVA layer thickness of 35 μm into a rectangular sheet 22 (197 mm×78 mm) having an internal cutout of 115 mm×48 mm. Then with allowing the EVA surface of the sheet 22 in contact with the opposite surface to the coated layer in the sheet 23, the overlaid material was subjected to thermo-compression bonding using a hot press machine at 120° C. under a pressure of 50 kgf/cm$^2$ for 120 seconds. The thermo-compression bonding made the EVA fused in the interface between the sheets 22 and 23 to give an EVA-filled portion 24. After thermo-compression bonding, six through-holes each having a diameter of 9 mm were formed in the laminate sheet as shown in FIG. 5A. Thus obtained sheet was heat-treated at 160° C. for 30 minutes to form physical crosslinks. Then, the film was immersed in an aqueous electrolyte solution of sodium sulfate (2 mol/L) for 24 hours. After adding concentrated sulfuric acid into the aqueous electrolyte solution until the solution had a pH of 1, the film was immersed in a 0.05% by volume of glutaraldehyde aqueous solution, and crosslinking treatment was carried out at 25° C. with stirring for 24 hours. Herein, as the glutaraldehyde aqueous solution, was used a water-diluted solution of "glutaraldehyde" (25 vol %) produced by Ishizu Chemicals Co., Ltd. After the crosslinking treatment, the film was immersed in deionized water. With exchanging the deionized water several times, the film was immersed therein until reaching to swelling equilibrium so as to obtain an anion exchange membrane 21.

[Evaluation of Ion Exchange Membrane]

In thus obtained anion exchange membrane produced in this manner, a portion for flow channel was cut into a desired size to obtain a measurement sample. With thus obtained sample, measurements were carried out in accordance with the above described methods for zeta potential, membrane resistance, and dynamic transport number. Table 4 shows the obtained results.

[Preparation of Cation Exchange Membranes CEM-1 to CEM-4 and CEM-6]

Except for using the anionic polymers as shown in Table 5 instead of the cationic polymer, cation exchange membranes were obtained in the same manner as the preparation of AEM-1 to measure the membrane properties thereof. Table 5 shows the obtained measurement results.

TABLE 5

| Cation exchange membrane | Anionic polymer | Anionic polymer solution Conc. of polymer aqueous solution (mass %) | Viscosity of polymer aqueous solution (mPa·s) | Substrate Type | Basis weight (g/m$^2$) | Thickness (μm) | Density (g/cm$^3$) | Porosity (%) | Liquid Thickness (μm) | Zeta potential (mV) ζ1 | ζ2 | (\|ζ1\|) − \|ζ2\|)/\|ζ1\| | Membrane resistance (Ωcm$^2$) | Dynamic transport number td+ (—) |
|---|---|---|---|---|---|---|---|---|---|---|---|---|---|---|
| CEM-1 | P-2 | 11 | 1200 | Vinylon paper | 36 | 90 | 0.40 | 67 | 800 | −2.2 | −1.8 | 0.18 | 36 | 0.91 |
| CEM-2 | P-6 | 11 | 1500 | Vinylon paper | 36 | 90 | 0.40 | 67 | 800 | −11.4 | −9.2 | 0.19 | 4.8 | 0.98 |
| CEM-3 | P-6 | 11 | 1500 | Vinylon paper | 36 | 90 | 0.40 | 67 | 700 | −11.4 | −7.4 | 0.35 | 4.6 | 0.98 |
| CEM-4 | P-6 | 11 | 1500 | Vinylon paper | 36 | 90 | 0.40 | 67 | 400 | −11.4 | −6 | 0.47 | 3.8 | 0.98 |
| CEM-5 | P-7 | 11 | 1200 | Polyester mesh | 15 | 80 | 0.19 | 85 | 800 | −10.8 | −9.2 | 0.15 | 2.5 | 0.96 |
| CEM-6 | P-8 | 11 | 1200 | Vinylon paper | 36 | 90 | 0.40 | 67 | 800 | −6.1 | −5.4 | 0.11 | 16 | 0.93 |
| CEM-7 | P-6 | 11 | 1500 | Polyester paper | 50 | 100 | 0.50 | 60 | 800 | −11.4 | −9 | 0.21 | 5.4 | 0.98 |
| CEM-8 | P-6 | 11 | 1500 | Vinylon paper | 36 | 90 | 0.40 | 67 | — | −11.4 | −1 | 0.91 | 3.6 | 0.98 |
| CEM-9 | P-6 | 11 | 1500 | Vinylon paper* | — | — | — | — | — | −11.4 | −1 | 0.91 | 3.6 | 0.98 |

*A heat-sealable film of PET/EVA (ethylene-vinyl acetate copolymer) was adhered on the backside surface of the vinylon paper.

[Preparation of Cation Exchange Membranes CEM-5]

Except for changing the cationic polymer into anionic polymers shown in Table 5, cation exchange membranes were obtained in the same manner as the preparation of AEM-5 to measure the membrane properties thereof. Table 5 shows the obtained measurement results.

[Preparation of Cation Exchange Membranes CEM-7]

Except for changing the cationic polymer into anionic polymers shown in Table 5, cation exchange membranes were obtained in the same manner as the preparation of AEM-7 to measure the membrane properties thereof. Table 5 shows the obtained measurement results.

[Preparation of Cation Exchange Membranes CEM-8]

Except for changing the cationic polymer into anionic polymers shown in Table 5, cation exchange membranes were obtained in the same manner as the preparation of AEM-8 to measure the membrane properties thereof. Table 5 shows the obtained measurement results.

[Preparation of Cation Exchange Membranes CEM-9]

Except for changing the cationic polymer into anionic polymers shown in Table 5, cation exchange membranes were obtained in the same manner as the preparation of AEM-9 to measure the membrane properties thereof. Table 5 shows the obtained measurement results.

Example 1

(Measurement of Cell Resistance)

A desalting test was conducted using a small electrodialyzer MICRO ACILYZER S3 (manufactured by ASTOM Corporation). AEM-1 was used as an anion exchange membrane, and CEM-1 was used as a cation exchange membrane. Surfaces of the membranes, each having a higher zeta potential of the ion exchange membrane face toward a desalting compartment, and the anion exchange membranes and the cation exchange membranes were alternately arranged and fastened between a cathode and an anode. Herein, electrodialysis was performed at a current density of 10 mA/cm$^2$ at 25° C. for 30 minutes by circulating supply of a saline solution (volume: 500 mL) with a concentration of 3,000 ppm to desalting compartments and concentration compartments. Results of measuring the cell resistance (R1) at 10 minutes after starting the treatment are shown in Table 6. Rearrangement was then performed so that surfaces of AEM-1 as the anion exchange membrane and CEM-1 as the cation exchange membrane, each having a higher zeta potential of the ion exchange membrane faces toward a concentration compartment, and the anion exchange membranes and the cation exchange membranes were alternately arranged and fastened between a cathode and an anode. Electrodialysis was performed in the same manner as described above. Results of measuring the cell resistance (R2) at 10 minutes after starting the treatment are shown in Table 6.

(Blister Test Through Long-Run Operation)

A long-run desalting test was conducted using a small electrodialyzer MICRO ACILYZER S3 (manufactured by ASTOM Corporation). AEM-1 was used as an anion exchange membrane, and CEM-1 was used as a cation exchange membrane. Surfaces of the membranes each having a higher zeta potential of the ion exchange membrane face toward a desalting compartment, and the anion exchange membranes and the cation exchange membranes were alternately arranged between a cathode and an anode, and fastened. Herein, electrodialysis was performed at a current density of 10 mA/cm$^2$ at 25° C. for 48 hours by continuously supplying a saline solution with a concentration of 3,000 ppm to a desalting compartment and a concentration compartment. Thereafter, the membranes were taken out, and a blister (water blister) presence for each membrane was visually observed.

(Evaluation Criteria in Blister Test)
1: The membrane has no blister over the entire surface.
2: A part of the membrane has blisters, but the level thereof is trivial from a practical point of view.
3. The membrane has blisters uniformly over the entire surface.

Examples 2 to 7

Except for using the anion exchange membranes and the cation exchange membranes shown in Table 6, electrodialysis tests were carried out in the same manner as Example 1. Table 6 shows the obtained measurement results.

Comparative Example 1

Except for using the anion exchange membranes and the cation exchange membranes shown in Table 6, electrodialysis tests were tried to be carried out in the same manner as Example 1. However, the test was unable to be carried out because of vigorous external leakage from the cell.

Comparative Example 2

Except for using the anion exchange membranes and the cation exchange membranes shown in Table 6, electrodialysis tests were tried to be carried out in the same manner as Example 1. The cell used did not have external leakage due to the membrane in which the back surface was reinforced with the heat-sealable film. The obtained measurement results are shown in Table 6.

Examples 1, 2 and 5-7), due to small electrical difference between both sides of the membrane, these Examples are presumed to be suitably applied to electrodialysis apparatus (especially electrodialysis reversal apparatus).

Example 8

(Electrodialysis Reversal Test)

Electrodialysis reversal test was carried out using a small electrodialyzer MICRO ACILYZER S3 (manufactured by ASTOM Corporation) in which a four-way switch was connected to the electrodes so as to make it possible to switch electrodes manually. AEM-2 was used as an anion exchange membrane, and CEM-2 was used as a cation exchange membrane. Surfaces of the membranes, each having a higher zeta potential of the ion exchange membrane face toward a desalting compartment, and the anion exchange membranes and the cation exchange membranes were alternately arranged and fastened between a cathode and an anode. Herein, electrodialysis was performed with connecting AEM-2 and CEM-2 to the anode and the cathode, respectively, at a current density of 10 mA/cm$^2$ at 25° C. for 5 minutes by circulating supply of a saline solution (volume: 500 mL) with a concentration of 3,000 ppm to desalting compartments and concentration compartments. Then, reversal of the polarity of the electrode (reversal 1) was performed to carry out another electrodialysis for 10 minutes. Thereafter, reversal of electrodes (reversal 2) was performed to carry out another electrodialysis for 10 minutes. Further, reversal of electrodes (reversal 3) was per-

TABLE 6

| | Anion Exchange membrane | Cation Exchange membrane | Orientation of ζ1 surfaces of both membranes | Electrodialysis test Cell Resistance R1 (Ω) | Orientation of ζ1 surfaces of both membranes | Cell Resistance R2 (Ω) | R2/R1 | Blister presence |
|---|---|---|---|---|---|---|---|---|
| Example 1 | AEM-1 | CEM-1 | Desalting compartment side | 110 | Concentration compartment side | 115 | 1.0 | 1 |
| Example 2 | AEM-2 | CEM-2 | Desalting compartment side | 18.8 | Concentration compartment side | 19.3 | 1.0 | 1 |
| Example 3 | AEM-3 | CEM-3 | Desalting compartment side | 18.8 | Concentration compartment side | 30.3 | 1.6 | 1 |
| Example 4 | AEM-4 | CEM-4 | Desalting compartment side | 18.8 | Concentration compartment side | 48.6 | 2.6 | 1 |
| Example 5 | AEM-5 | CEM-5 | Desalting compartment side | 18.1 | Concentration compartment side | 18.7 | 1.0 | 2 |
| Example 6 | AEM-6 | CEM-6 | Desalting compartment side | 58.8 | Concentration compartment side | 63.2 | 1.1 | 1 |
| Example 7 | AEM-7 | CEM-7 | Desalting compartment side | 20.5 | Concentration compartment side | 25.6 | 1.2 | 2 |
| Comparative Example 1 | AEM-8 | CEM-8 | | Test was unable to be carried out because of vigorous external leakage from the cell. | | | | |
| Comparative Example 2 | AEM-9 | CEM-9 | Desalting compartment side | 19.1 | Concentration compartment side | 195 | 10 | 1 |

Figure 6:
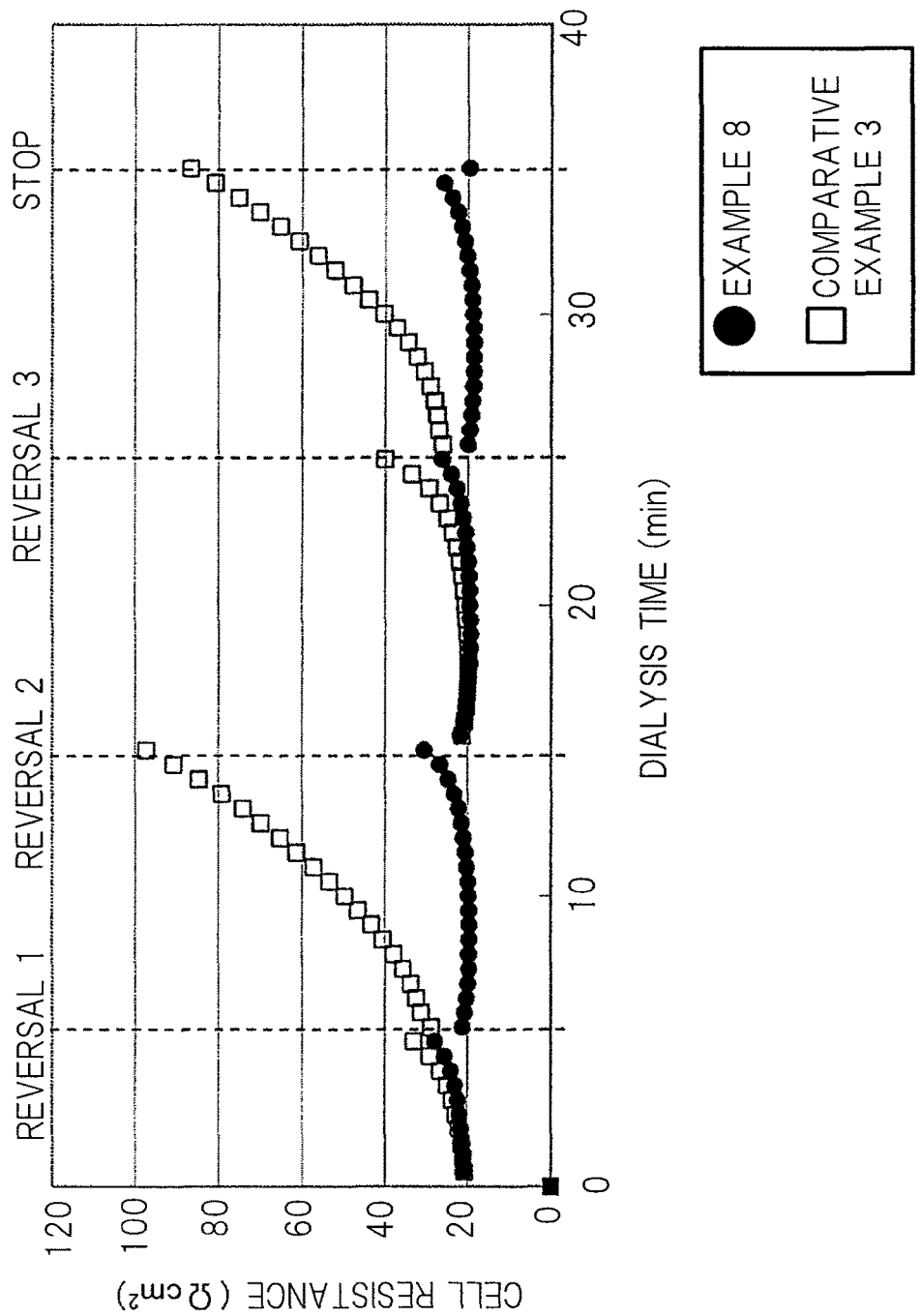
FIG. 6 is a graph showing variations in cell resistance in an electrodialysis reversal test conducted in Example 8.
Figure 7:
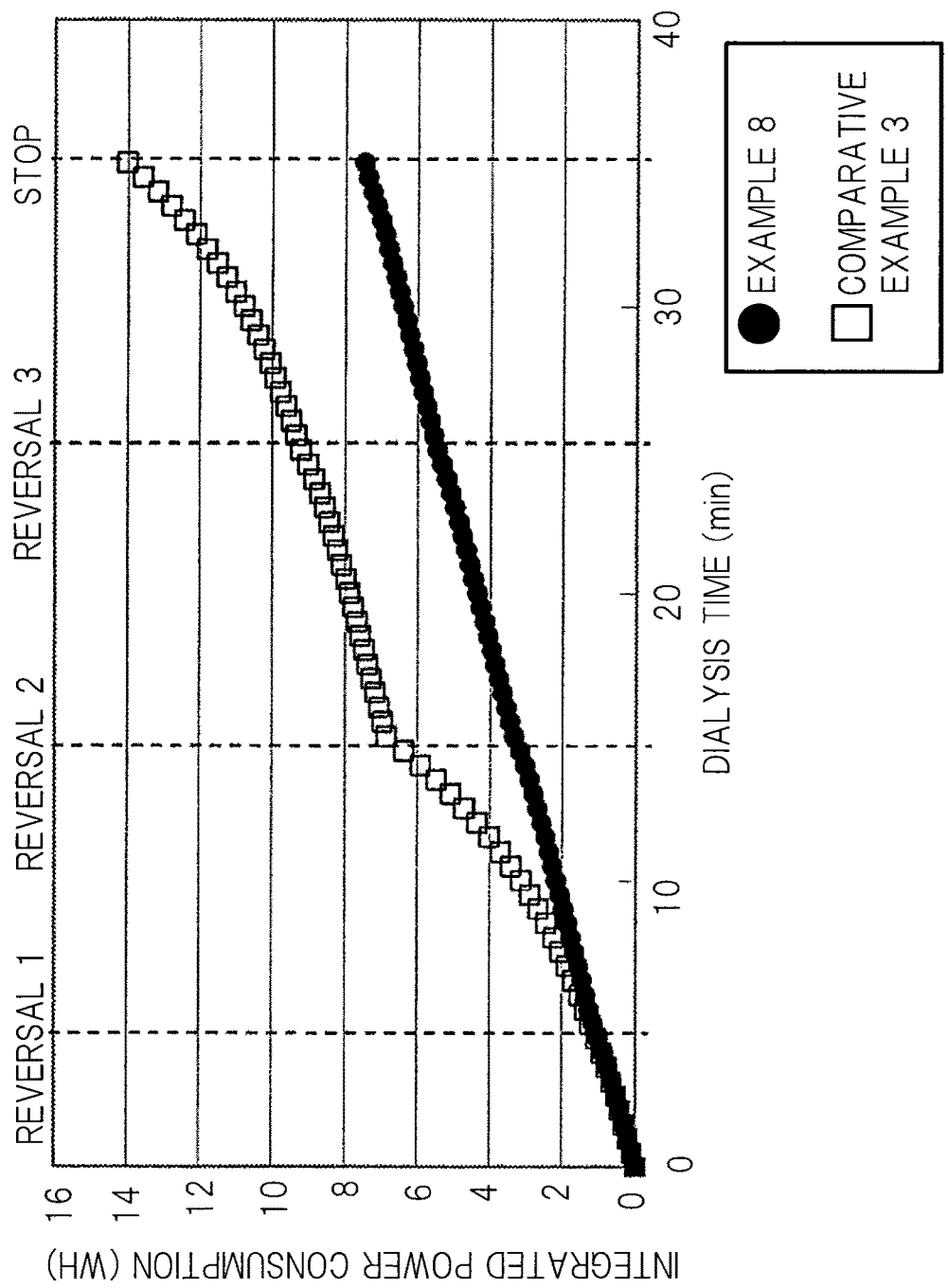
FIG. 7 is a graph showing a relationship between the processing time and the integrated power consumption in the electrodialysis reversal test conducted in Example 8.

As shown in Table 6, in Comparative Example 1, absence of the impregnated layer causes vigorous external leakage of the cell, resulting in failing to carry out the electrodialysis test. In contrast, in Examples 1 to 7, satisfactorily electrodialysis could be carried out with hardly or no generating blisters even in the long period of electrodialysis. In particular, in Examples 1 to 4 and 6, blister was not occurred at all. Further, especially in Examples 1 to 7 (in particular formed to carry out another electrodialysis for 10 minutes. Cell resistance at the time was 26 (Ω). FIG. 6 shows the variation of cell resistance in this period. In addition, during this time, the integrated power consumption was 7.5 (WH). FIG. 7 shows the relationship between processing time and integrated power consumption during this time.

As shown in FIG. 6, Comparative Example 3 has a large cell resistance that is elevated over three-times during the reverse-phase operation as reversals 1 and 3 compared to normal-phase operation, whereas Example 8 has a cell resistance that is hardly elevated even in the reverse-phase operation.

In addition, as shown in FIG. 7, Comparative Example 3 has a rapidly increased power consumption increase rate during the reverse-phase operation compered to normal-phase operation, whereas Example 8 has a stable power consumption increase rate in both normal-phase and reverse-phase operations.

Examples 9 and 10

Except for using the anion exchange membranes and the cation exchange membranes shown in Table 7, the electrodialysis reversal test was carried out in the same manner as Example 8. Table 7 shows the obtained measurement results.

Comparative Example 3

Except for using the anion exchange membranes and the cation exchange membranes shown in Table 7, the electrodialysis reversal test was carried out in the same manner as Example 8. Table 7 shows the obtained measurement results.

TABLE 7

|  | Anion exchange membrane | Cation exchange membrane | Electrodialysis reversal test | |
|---|---|---|---|---|
|  |  |  | Cell resistance 10 min. after reversal 3 | Integrated power consumption (WH) |
| Example 8 | AEM-2 | CEM-2 | 26 | 7.5 |
| Example 9 | AEM-3 | CEM-3 | 41 | 8.0 |
| Example 10 | AEM-4 | CEM-4 | 67 | 8.8 |
| Comparative Example 3 | AEM-9 | CEM-9 | 103 | 15 |

As shown in Table 7, in Comparative Example 3 having an R2/R1 ratio of 10, the cell resistance when performing a reverse-phase operation upon reversal 3 is equal to or greater than 100Ω at 10 minutes after reversal 3. In contrast, in Examples 8 to 10 each having an R2/R1 ratio of 3 or lower, electrodialysis can be operated at cell resistances of about half or lower of Comparative Example 3. In particular, in Example 8 having a small difference in zeta potential between the front and back surfaces of the ion exchange membrane so as to reduce ion concentration polarization in the membrane, the cell resistance can be reduced to about ¼ or lower of Comparative Example 3.

As for the integrated power consumption, Examples 8 to 10 can be operated at about half of that of Comparative Example 3.

INDUSTRIAL APPLICABILITY

Since the ion exchange membrane according to the present invention employs a specific ionic polymer, the membrane is excellent in fouling resistance, and can be effectively used as a membrane for electrodialysis. In particular, the ion exchange membrane according to the present invention has a small potential difference between the front and back surfaces so as to suppress the ion concentration polarization in the membrane. Such a membrane can decrease the value of the cell resistance, and also suitably be used as an ion exchange membrane for electrodialysis apparatus (especially electrodialysis reversal apparatus).

As described above, preferred embodiments according to the present invention are shown and described. It is to be understood that various changes, modifications and omissions may be made without departing from the spirit according to the present invention and are encompassed in the scope of the claims.

What is claimed is:

1. An ion exchange membrane comprising a porous support and an ionic vinyl alcohol polymer, wherein
    at least a part of the porous support is impregnated with the ionic vinyl alcohol polymer in a thickness direction from one surface of the porous support to form an impregnated layer;
    the porous support is a wet-laid nonwoven fabric or a synthetic resin fabric;
    the ionic vinyl alcohol polymer comprises at least an ionic vinyl alcohol polymer having an ion exchange group selected from a cation exchange group or an anion exchange group; and
    the ion exchange membrane has a zeta potential value ($\zeta 1$) at one surface and a zeta potential value ($\zeta 2$) at the other surface, which are represented by the formula (1), $$(|\zeta 1|-|\zeta 2|)/|\zeta 1|<0.5 \; (|\zeta 1|\geq|\zeta 2|) \tag{1}$$

2. The ion exchange membrane as claimed in claim 1, wherein the porous support has a porosity of 40 to 90%.

3. The ion exchange membrane as claimed in claim 1, wherein the ionic vinyl alcohol polymer is a copolymer of an ion exchange monomer and a monomer forming a vinyl alcohol polymer; and the ion exchange monomer content is 0.1% by mole or higher in the ionic vinyl alcohol polymer.

4. The ion exchange membrane as claimed in claim 1, wherein the ionic vinyl alcohol polymer is a block copolymer comprising a copolymer component of polymerized ion exchange monomer and a polyvinyl alcohol copolymer component.

5. The ion exchange membrane as claimed in claim 1, wherein the ionic vinyl alcohol polymer is a crosslinked polymer in a state applied to the porous support.

6. The ion exchange membrane as claimed in claim 1, wherein the porous support is a wet-laid nonwoven fabric of polyvinyl alcohol cut fibers.

7. The ion exchange membrane as claimed in claim 1, wherein the ion exchange membrane is used for an electrodialyzer.

8. A method for producing the ion exchange membrane as claimed in claim 1 comprising:
    providing a solution of an ionic vinyl alcohol polymer;
    applying the solution onto a release film to form a coated fluid layer containing the ionic vinyl alcohol polymer;
    overlaying a porous support onto the coated fluid layer, and impregnating at least a part of the porous support with the ionic vinyl alcohol polymer solution to form an impregnated body;
    drying the impregnated body in which the porous support is overlaid to be impregnated with the coated fluid layer on the release film; and
    peeling the release film from the dried impregnated body.

9. The method as claimed in claim 8, wherein the ionic vinyl alcohol polymer is subjected to a heat treatment and/or a crosslinking treatment after peeling the release film.

10. The method as claimed in claim 9, wherein the ionic vinyl alcohol polymer is subjected to a crosslinking treatment after subjecting the ionic vinyl alcohol polymer to the heat treatment.

11. An electrodialyzer at least comprises:
an anode and a cathode; and
a desalting compartment and a concentration compartment each formed by alternately arranging an anion exchange membrane and a cation exchange membrane between the anode and the cathode, wherein
the anion exchange membrane and the cation exchange membrane each includes an ion exchange membrane recited in claim 1.

12. The ion exchange membrane as claimed in claim 1, wherein the synthetic resin fabric is a woven fabric or a knitted fabric.

\* \* \* \* \*